US010942753B2

(12) United States Patent
Li

(10) Patent No.: US 10,942,753 B2
(45) Date of Patent: Mar. 9, 2021

(54) DATA LOADING SYSTEM

(71) Applicant: Huawei Technologies Co., Ltd., Shenzhen (CN)

(72) Inventor: Yansong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 16/277,258

(22) Filed: Feb. 15, 2019

(65) Prior Publication Data

US 2019/0179644 A1 Jun. 13, 2019

Related U.S. Application Data

(63) Continuation of application No. PCT/CN2017/078026, filed on Mar. 24, 2017.

(30) Foreign Application Priority Data

Aug. 15, 2016 (CN) .......................... 2016 1 0668111

(51) Int. Cl.
*G06F 9/00* (2006.01)
*G06F 9/445* (2018.01)
(Continued)

(52) U.S. Cl.
CPC ........... *G06F 9/445* (2013.01); *G06F 9/4405* (2013.01); *G06F 9/4411* (2013.01);
(Continued)

(58) Field of Classification Search
CPC .... G06F 9/445; G06F 9/44505; G06F 13/405; G06F 9/4405; G06F 13/4291;
(Continued)

(56) References Cited

U.S. PATENT DOCUMENTS 6,049,222 A * 4/2000 Lawman ............. G06F 15/7867 326/38
6,538,468 B1 * 3/2003 Moore .................. G06F 9/4411 326/37
(Continued)

FOREIGN PATENT DOCUMENTS

CN 1808374 A 7/2006
CN 101165652 A 4/2008
(Continued)

OTHER PUBLICATIONS

Machine Translation and Abstract of Chinese Publication No. CN1808374, dated Jul. 26, 2006, 6 pages.
(Continued)

*Primary Examiner* — Volvick Derose
(74) *Attorney, Agent, or Firm* — Conley Rose, P.C.

(57) ABSTRACT

A data loading system includes a processing circuit, a nonvolatile memory, and a programmable logic device. The processing circuit and the programmable logic device are separately coupled to different data interfaces of the nonvolatile memory. The nonvolatile memory stores start code of the processing circuit and configuration data of the programmable logic device, and the processing circuit and the programmable logic device are configured to respectively obtain the start code and the configuration data from the nonvolatile memory at the same time under the action of a first synchronization clock. Hence, the system increases a speed and reliability of data loading and increases a start speed and reliability of a board.

20 Claims, 8 Drawing Sheets

201
203
Processor
Memory
PCIe
Accelerator (FPGA)
202

(51) Int. Cl.
*G06F 13/40* (2006.01)
*G06F 9/4401* (2018.01)
*G06F 13/42* (2006.01)
*G06F 13/16* (2006.01)

(52) U.S. Cl.
CPC ...... *G06F 9/44505* (2013.01); *G06F 13/1689* (2013.01); *G06F 13/405* (2013.01); *G06F 13/4045* (2013.01); *G06F 13/4291* (2013.01); *G06F 9/4401* (2013.01)

(58) Field of Classification Search
CPC ............... G06F 9/4411; G06F 13/1689; G06F 13/4045; G06F 9/44521
USPC .............................................................. 713/1
See application file for complete search history.

(56) References Cited

U.S. PATENT DOCUMENTS

| | | | | |
|---|---|---|---|---|
| 6,636,962 | B1 * | 10/2003 | Sun | G06F 8/60 713/1 |
| 7,088,132 | B1 * | 8/2006 | Tang | H03K 19/17748 326/39 |
| 7,425,843 | B1 | 9/2008 | Edwards et al. | |
| 7,822,958 | B1 * | 10/2010 | Allen | G06F 9/4401 713/1 |
| 9,348,783 | B2 | 5/2016 | Kelly et al. | |
| 2003/0122578 | A1 * | 7/2003 | Masui | G06F 21/76 326/39 |
| 2003/0233534 | A1 * | 12/2003 | Bernhard | G06F 9/4411 713/1 |
| 2012/0221832 | A1 | 8/2012 | Narayanan et al. | |
| 2013/0282945 | A1 * | 10/2013 | Kelly | G06F 13/40 710/305 |

FOREIGN PATENT DOCUMENTS

| | | | |
|---|---|---|---|
| CN | 101901156 | A | 12/2010 |
| CN | 102043648 | A | 5/2011 |
| CN | 102347896 | A | 2/2012 |
| CN | 102722390 | A | 10/2012 |
| CN | 103777972 | A | 5/2014 |
| CN | 103823698 | A | 5/2014 |
| CN | 106293843 | A | 1/2017 |

OTHER PUBLICATIONS

Machine Translation and Abstract of Chinese Publication No. CN101165652, dated Apr. 23, 2008, 14 pages.
Machine Translation and Abstract of Chinese Publication No. CN101901156, dated Dec. 1, 2010, 12 pages.
Machine Translation and Abstract of Chinese Publication No. CN102043648, dated May 4, 2011, 14 pages.
Machine Translation and Abstract of Chinese Publication No. CN102347896, dated Feb. 8, 2012, 16 pages.
Machine Translation and Abstract of Chinese Publication No. CN102722390, dated Oct. 10, 2012, 10 pages.
Machine Translation and Abstract of Chinese Publication No. CN103777972, dated May 7, 2014, 22 pages.
Machine Translation and Abstract of Chinese Publication No. CN103823698, dated May 28, 2014, 9 pages.
Machine Translation and Abstract of Chinese Publication No. CN106293843, dated Jan. 4, 2017, 39 pages.
Foreign Communication From a Counterpart Application, Chinese Application No. 201610668111.9, Chinese Office Action dated Feb. 3, 2019, 9 pages.
Foreign Communication From a Counterpart Application, PCT Application No. PCT/CN2017/078026, English Translation of International Search Report dated May 31, 2017, 2 pages.
Foreign Communication From a Counterpart Application, PCT Application No. PCT/CN2017/078026, English Translation of Written Opinion dated May 31, 2017, 5 pages.
Howell, S., et al., "UltraScale FPGA Post-Configuration Access of SPI Flash Memory using STARTUPE3," XP055599376, Application notes of Xilinx, Jun. 2, 2016, 34 pages.
Nielson, M., et al., "SPI Configuration and Flash Programming in UltraScale FPGAs," XP055599470, Application Notes of Xilinx, May 29, 2015, 41 pages.
Kohn, C., "Partial Reconfiguration of a Hardware Accelerator on Zynq-7000 All Programmable SoC Devices," XP055600104, Application Notes of Xilinx on line, Jan. 21, 2013, 19 pages.
Foreign Communication From a Counterpart Application, European Application No. 17840741.7, Extended European Search Report dated Jul. 12, 2019, 12 pages.
"Zynq-7000 All Programmable SoC, Technical Reference Manual," XP2792668A, UG585 (vol. 10), Part 1, Feb. 23, 2015, 155 pages.
"Zynq-7000 All Programmable SoC, Technical Reference Manual," XP2792668A, UG585 (vol. 10), Part 2, Feb. 23, 2015, 155 pages.
"Zynq-7000 All Programmable SoC, Technical Reference Manual," XP2792668A, UG585 (vol. 10), Part 3, Feb. 23, 2015, 155 pages.
"Zynq-7000 All Programmable SoC, Technical Reference Manual," XP2792668A, UG585 (vol. 10), Part 4, Feb. 23, 2015, 155 pages.
"Zynq-7000 All Programmable SoC, Technical Reference Manual," XP2792668A, UG585 (vol. 10), Part 5, Feb. 23, 2015, 155 pages.
"Zynq-7000 All Programmable SoC, Technical Reference Manual," XP2792668A, UG585 (vol. 10), Part 6, Feb. 23, 2015, 155 pages.
"Zynq-7000 All Programmable SoC, Technical Reference Manual," XP2792668A, UG585 (vol. 10), Part 7, Feb. 23, 2015, 155 pages.
"Zynq-7000 All Programmable SoC, Technical Reference Manual," XP2792668A, UG585 (vol. 10), Part 8, Feb. 23, 2015, 155 pages.
"Zynq-7000 All Programmable SoC, Technical Reference Manual," XP2792668A, UG585 (vol. 10), Part 9, Feb. 23, 2015, 155 pages.
"Zynq-7000 All Programmable SoC, Technical Reference Manual," XP2792668A, UG585 (vol. 10), Part 10, Feb. 23, 2015, 155 pages.
"Zynq-7000 All Programmable SoC, Technical Reference Manual," XP2792668A, UG585 (vol. 10), Part 11, Feb. 23, 2015, 155 pages.
"Zynq-7000 All Programmable SoC, Technical Reference Manual," XP2792668A, UG585 (vol. 10), Part 12, Feb. 23, 2015, 158 pages.

* cited by examiner

DATA LOADING SYSTEM

CROSS-REFERENCE TO RELATED APPLICATIONS

This application is a continuation of International Patent Application No. PCT/CN2017/078026 filed on Mar. 24, 2017, which claims priority to Chinese Patent Application No. 201610668111.9 filed on Aug. 15, 2016. The disclosures of the aforementioned applications are hereby incorporated by reference in their entireties.

TECHNICAL FIELD

This application relates to the field of communications technologies, and in particular, to a data loading technology in a new processing architecture including a general-purpose processor and an accelerator.

BACKGROUND

With the rapid development of Internet services, an increasingly high requirement is imposed on a processing capability of a communications system. However, a conventional processing architecture that includes a general-purpose processor and software cannot meet a processing requirement of the communications system. Therefore, the conventional processing architecture is gradually replaced with a new processing architecture including a general-purpose processor and an accelerator that is implemented by a programmable logic device.

In the new processing architecture including the general-purpose processor and the accelerator, after a board that carries the new processing architecture is powered on and reset, the processor needs to load start code from a nonvolatile memory, and the accelerator also needs to load configuration data from the nonvolatile memory. However, currently, a process of loading data from the nonvolatile memory to the processor and the accelerator consumes a relatively long time. Consequently, a start speed of the board is affected, a case in which the other component cannot perform loading because either the processor or the accelerator fails to perform loading easily occurs, and as a result, neither the processor nor the accelerator can work normally, and reliability of the board is poor.

SUMMARY

This application provides a data loading system to increase a speed and reliability of data loading and increase a start speed and reliability of a board.

To achieve the foregoing objectives, according to one aspect, an embodiment of this application provides a data loading system. The data loading system includes a processing module, a nonvolatile memory, and a programmable logic device. The processing module and the programmable logic device are separately connected to different data interfaces of the nonvolatile memory, the nonvolatile memory stores start code of the processing module and configuration data of the programmable logic device, and the processing module and the programmable logic device respectively obtain the start code and the configuration data from the nonvolatile memory at the same time under the action of a first synchronization clock. In this way, the processing module and the programmable logic device simultaneously obtain the start code or the configuration data required for loading such that the processing module and the programmable logic device can perform data loading under triggering of the first synchronization clock in parallel. This can reduce a time consumed by the processing module and the programmable logic device for loading, and increase a start speed of a board carrying the processing module and an accelerator.

In addition, the processing module and the programmable logic device can simultaneously perform data loading instead of sequentially performing data loading. Therefore, even if the processing module or a programmable logic device is faulty, data loading on a processing module or a programmable logic device that is not faulty is not affected. This can increase reliability of data loading.

In a possible design, the nonvolatile memory uses a serial peripheral interface (SPI), and the data loading system further includes an SPI module connected to the processing module. An input/output pin in the SPI module is connected to an input/output pin DQ0 in the SPI interface of the nonvolatile memory. Correspondingly, the programmable logic device is connected to an input/output pin other than the DQ0 in the SPI interface of the nonvolatile memory. Because the SPI interface of the nonvolatile memory may have a plurality of input/output pins, and the nonvolatile memory can simultaneously output data using two or more input/output pins in the SPI interface, the nonvolatile memory can simultaneously output data to the pin DQ0 and an input/output pin connected to the programmable logic device such that when the processing module receives the start code from the DQ0, the programmable logic device can obtain the configuration data from the input/output pin connected to the nonvolatile memory.

In a possible design, the data loading system may further include a clock processing logic circuit and an external SPI clock module. In this case, when the processing module does not obtain all start code, the processing module may control the SPI module to output the first synchronization clock to the clock processing logic circuit such that the clock processing logic circuit divides the first synchronization clock into two channels of synchronization clock, and simultaneously outputs the two channels of synchronization clock to the nonvolatile memory and the programmable logic device. When the processing module obtains all start code, the processing module controls the SPI module to stop outputting the first synchronization clock. In this case, if the processing module currently determines that the programmable logic device does not load all configuration data, the clock processing logic circuit may receive a second synchronization clock output by the external SPI clock module, and divide the second synchronization clock into two channels of synchronization clock, and simultaneously output the two channels of synchronization clock to the programmable logic device and the nonvolatile memory such that the programmable logic device and the nonvolatile memory can still obtain a synchronization clock. In this way, the nonvolatile memory may still output the configuration data under triggering of the synchronization clock such that the programmable logic device can load all the configuration data.

In a possible design, a manner of triggering the clock processing logic circuit to receive the second synchronization clock from the external SPI clock module may be, when the programmable logic device does not load all the configuration data, the processing module outputs an indication signal to a clock to trigger, using the indication signal, the clock processing logic circuit to receive the second synchronization clock from the external SPI clock module.

Alternatively, when the clock processing logic circuit cannot detect the first synchronization clock output by the SPI module connected to the processing module, and determines that the programmable logic device does not load all the configuration data, the clock processing logic circuit is switched to receive the second synchronization clock from the external SPI clock module.

In a possible design, after dividing the first synchronization clock into two channels of synchronization clock whose clock frequencies are the same as that of the first synchronization clock, the clock processing logic circuit separately outputs the two channels of synchronization clock obtained through division to the nonvolatile memory and the programmable logic device such that one synchronization clock is input to each of the nonvolatile memory and the programmable logic device.

In a possible design, after dividing the second synchronization clock into two channels of synchronization clock whose clock frequencies are the same as that of the second synchronization clock, the clock processing logic circuit separately outputs the two channels of synchronization clock obtained through division to the nonvolatile memory and the programmable logic device such that one synchronization clock is input to each of the nonvolatile memory and the programmable logic device.

In a possible design, the processing module is further configured to first control the SPI module to send a read command and a start address to the DQ0 in the nonvolatile memory such that the nonvolatile memory outputs the start code from the DQ0 and outputs the configuration data from the second pin according to the read command and the start address, and when the processing module obtains the start code from the pin DQ0, the programmable logic device may obtain the configuration data from the second pin.

In a possible design, the nonvolatile memory works in an extended SPI protocol mode, and the read command is a dual output fast read dual output fast read command or a quad output fast read quad output fast read command such that the nonvolatile memory can simultaneously output data from two or four input/output pins in the SPI interface.

In a possible design, the read command is the dual output fast read command. The nonvolatile memory is connected to one programmable logic device, that is, the nonvolatile memory is not connected to another programmable logic device other than the programmable logic device. In each byte stored in the nonvolatile memory, bits 7, 5, 3, and 1 are used to store the configuration data, and bits 6, 4, 2, and 0 are used to store the start code. In this case, under triggering of a synchronization clock, bits 7, 5, 3, and 1 in each byte in the nonvolatile memory may be sequentially output from a pin DQ1 in the SPI interface, and bits 6, 4, 2, and 0 in each byte may be sequentially output from the pin DQ0 in the SPI interface. In addition, under triggering of the synchronization clock, the configuration data may be output from the DQ1 when the start code is output from the pin DQ0 such that when the processing module obtains the start code from the DQ0, the nonvolatile memory can obtain the configuration data from the pin DQ1.

Alternatively, the read command is the quad output fast read command. Bits 4 and 0 in each byte stored in the nonvolatile memory are used to store the start code, and a bit that is in each byte and that corresponds to the second pin is used to store the configuration data. In this case, under triggering of a synchronization clock, the nonvolatile memory simultaneously outputs data from input/output pins DQ3, DQ2, DQ1, and DQ0 in the SPI interface when a falling edge of the synchronization clock arrives. In addition, the start code in bit 4 and bit 0 in each byte in the nonvolatile memory is fixedly output from the DQ0. In this case, under triggering of the synchronization clock, the processing module may obtain the start code from the DQ when each rising edge of the synchronization clock arrives. Another bit in each byte stored in the nonvolatile memory corresponds to an input/output pin. In this case, after a bit corresponding to the second pin is used to store the configuration data, when each rising edge of the synchronization clock arrives, the nonvolatile memory outputs the configuration data in the bit corresponding to the second pin from the second pin such that the programmable logic device obtains the configuration data from the second pin.

In a possible design, the SPI module and the processing module are packaged into a chip, or the SPI module is packaged into a southbridge chip.

In a possible design, before receiving the first synchronization clock, the clock processing logic circuit sends a configuration clear instruction to the programmable logic device, and the configuration clear instruction is used to instruct the programmable logic device to clear the configuration data in the programmable logic device.

In a possible design, the logic circuit sends the configuration clear instruction to the programmable logic device when detecting that a board carrying the processing module and the programmable logic device performs cold start. If the board performs only hot start, the configuration data in the programmable logic device is not lost. Therefore, when the board performs hot start, the configuration data in the programmable logic device does not need to be reloaded. However, when the board performs clod start, the configuration data in the programmable logic device may be cleared, and the configuration data in the programmable logic device needs to be reloaded.

In a possible design, the data loading system may further include a memory connected to the processing module. Correspondingly, the processing module is further configured to store the read start code in the memory. In this case, when obtaining all the start code used to start the processor, the processing module may directly run the start code in the memory to increase a running speed.

In a possible design, the processor into which the processing module is integrated further includes a read-only memory (ROM). Before reading the start code from the nonvolatile memory, the processing module executes initialization code in the ROM to complete initialization on the processing module and the memory.

In a possible design, when the programmable logic device loads all the configuration data, the processing module may initialize the programmable logic device to implement a corresponding service.

According to another aspect, an embodiment of the present disclosure provides a server, and the foregoing data loading system is set in the server.

Compared with other approaches, in the solutions provided in this application, data loading can be simultaneously performed by the processor and the programmable logic device, to increase data loading efficiency. In addition, even if the processor or a programmable logic device is faulty, data loading on a processor or a programmable logic device that is not faulty is not affected. This increases reliability of data loading.

BRIEF DESCRIPTION OF DRAWINGS

To describe the technical solutions in some embodiments of this application more clearly, the following briefly describes the accompanying drawings describing some of the embodiments. The accompanying drawings in the following description show merely some embodiments of this application, and a person of ordinary skill in the art may still derive another drawing from the provided accompanying drawings without creative efforts.

DESCRIPTION OF EMBODIMENTS

The following clearly describes the technical solutions in the embodiments of this application with reference to the accompanying drawings in the embodiments of this application. The described embodiments are merely some but not all of the embodiments of this application. All other embodiments obtained by a person of ordinary skill in the art based on the embodiments of this application without creative efforts shall fall within the protection scope of this application.

Network architectures and service scenarios described in the following embodiments of this application aim to more clearly describe the technical solutions in the embodiments of this application, but are not intended to limit the technical solutions provided in the embodiments of this application. A person of ordinary skill in the art may know that as the network architectures evolve and a new business scenario emerges, the technical solutions provided in the embodiments of this application further apply to a similar technical problem.

Figure 1:
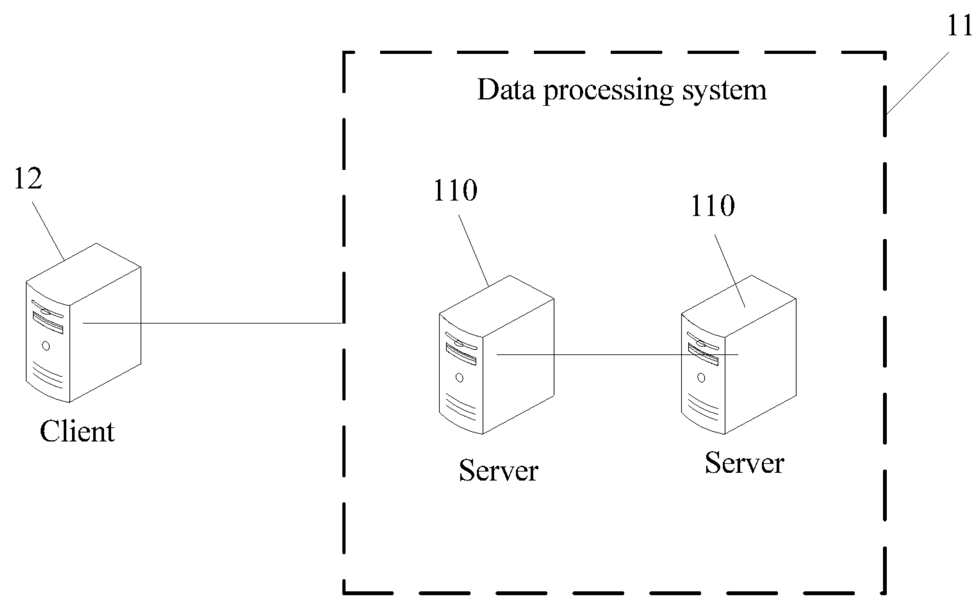
FIG. 1 is a schematic diagram of an application scenario according to this application.

FIG. 1 is a schematic diagram of an application scenario according to this application. In the application scenario in FIG. 1, a data processing system 11 includes at least one server 110. The data processing system 11 including the at least one server 110 may be a distributed server system or a centralized server cluster. Different servers 110 in the data processing system 11 may be interconnected using a network, and the network may be the Internet, an Internet Protocol (IP) storage area network (SAN), an intranet, a private network, and the like.

Any server 110 in the data processing system 11 may perform a data processing task.

For example, the server 110 may receive a data processing request sent by a client 12 using the network, and perform data processing based on the data processing request.

For another example, the data processing system 11 may further include a scheduling server (not shown in the figure), and the scheduling server is responsible for allocating the data processing task to the at least one server 110 to implement data processing.

To improve data processing performance, the server 110 has a new processing architecture including a processor and an accelerator. In the new processing architecture, the processor is responsible for completing complex protocol processing and a user interface function, and the accelerator completes a complex data processing operation, such as encryption or decryption, compression or decompression, or the like. The accelerator may be a programmable logic device. For example, the accelerator may be a field programmable gate array (FPGA).

Figure 2:
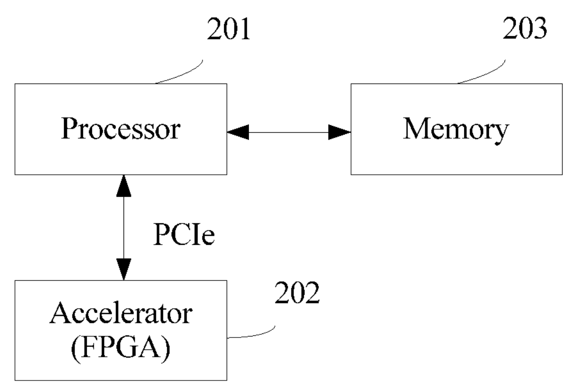
FIG. 2 is a schematic diagram of a possible processing architecture in a server.

The processor and the accelerator are usually disposed on a board. FIG. 2 is a schematic diagram of a board architecture including a processor and an accelerator. The board architecture includes a processor 201, an accelerator (for example, an FPGA) 202, and a memory 203. The accelerator 202 is used as a peripheral device of the processor 201, and the processor 201 is connected to the accelerator 202. For example, the processor 201 may be connected to the accelerator 202 using a Peripheral Component Interconnect Express (PCIe). In addition, the processor 201 is connected to the memory 203.

Figure 3:
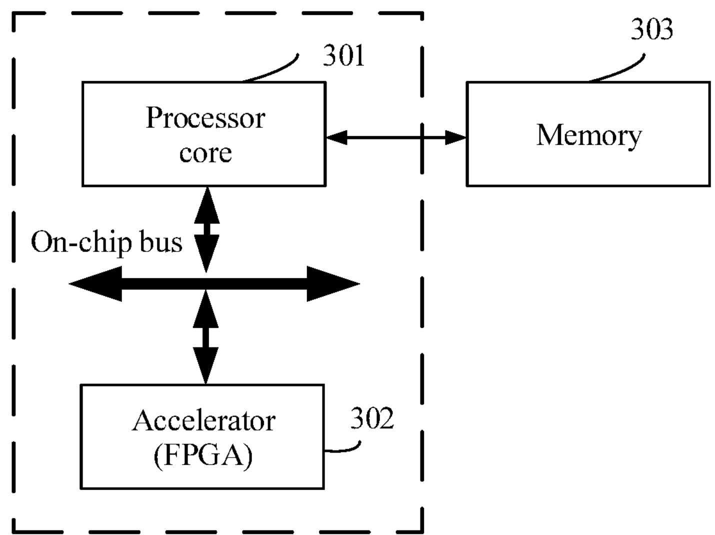
FIG. 3 is a schematic diagram of another possible processing architecture in a server.

With the development of a semiconductor technology, currently, a trend of integrating a processor core and an accelerator into a chip emerges, and a related product appears. The processor core and the accelerator are packaged into the chip such that flexibility of chip application is improved, and occupation of a board area is reduced. As shown in FIG. 3, a processor core 301 and an accelerator 302 (for example, an FPGA) are packaged into a chip. The processor core 301 may be connected to the accelerator 302 using an on-chip bus, and correspondingly, the processor core 301 is also connected to a memory 303.

It should be noted that in the new processing architecture including the processor and the accelerator, a quantity of accelerators is not limited to one, and the new processing architecture may include a plurality of accelerators. For example, the new processing architecture includes one processor and two accelerators, or the new processing architecture includes one processor and three or four accelerators. That the processing architecture includes only one accelerator is used as an example for description in FIG. 2 and FIG. 3. However, when the new processing architecture includes a plurality of accelerators, for a connection relationship between any accelerator and a processor, refer to a connection relationship in FIG. 2 and FIG. 3. Details are not described herein again.

The data processing system described in this application can be applied to a plurality of data processing scenarios such as big data analysis, cloud computing, and network security.

It may be understood that when a server has the new processing architecture including the processor and the accelerator, after a board that carries the new processing architecture is powered on and reset, the processor needs to load start code from a nonvolatile memory carried on the board, and the accelerator also needs to load configuration data from the nonvolatile memory. The entire board can start working only when the processor and all accelerators complete loading. However, in an existing manner, the processor and the accelerator sequentially perform data loading. For example, the processor first loads the start code, and after the processor completes loading of the start code, the processor controls the accelerator to load the configuration data. Alternatively, the accelerator first loads the configuration data, and the processor can load the start code only after the accelerator completes loading of the configuration data. It can be learned that in the existing manner, duration required by the board for completing data loading is a sum of duration required by the processor for data loading and duration required by all the accelerators for data loading, and therefore a time consumed by the board for completing data loading is relatively long and a start speed of the board is relatively slow. In addition, the processor and the accelerator sequentially perform loading, and a component can perform data loading only when a previous component completes data loading. Therefore, if the previous component is faulty and fails to load data, another component that does not load data cannot perform data loading, and consequently, a component that has no fault cannot work normally because data loading cannot be performed, and reliability of the board is poor.

Figure 4:
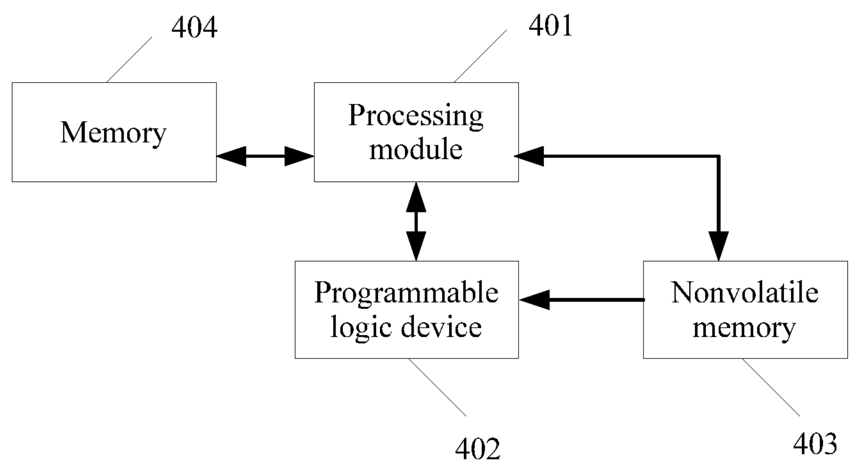
FIG. 4 is a schematic diagram of a hardware architecture of an embodiment of a data loading system according to this application.

To increase a start speed of a board and increase reliability of the board, an embodiment of this application provides a data loading system. The data loading system may be set in the server shown in FIG. 1. FIG. 4 is a schematic structural diagram of composition of an embodiment of a data loading system according to this application. The data loading system in this embodiment may include a processing module 401, a nonvolatile memory 403, and at least one programmable logic device 402. The processing module 401 and the programmable logic device 402 are separately connected to different data interfaces of the nonvolatile memory 403. The processing module 401 may be understood as a processor core (core) in a processor, the processing module 401 is usually packaged into a chip with another module (such as a digital signal processor (DSP) or a graphical processing unit (GPU)), and the chip is usually referred to as the processor.

In this embodiment of this application, the programmable logic device 402 is configured to implement a function of an accelerator.

Optionally, the programmable logic device may be an FPGA.

The nonvolatile memory 403 may be set based on a requirement. In a possible case, the nonvolatile memory 403 may be a flash memory, and certainly, the nonvolatile memory 403 may alternatively be a memory in another form. The nonvolatile memory 403 stores start code of the processing module 401 and configuration data of the programmable logic device 402.

The processing module 401 and the programmable logic device 402 are configured to respectively obtain the start code and the configuration data from the nonvolatile memory 403 at the same time under the action of a first synchronization clock.

It may be understood that, under triggering of the first synchronization clock, the processing module 401 and the programmable logic device 402 simultaneously read, from the nonvolatile memory 403, respective data required for loading. The processing module 401 reads the start code, and the programmable logic device 402 reads the configuration data.

Further, the nonvolatile memory 403 is configured to under triggering of the first synchronization clock, in each clock period of the first synchronization clock, transmit the start code to the processing module 401 through a data interface connected to the processing module 401, and transmit the configuration data to the programmable logic device 402 through a data interface connected to the programmable logic device 402.

Correspondingly, the processing module 401 is configured to under triggering of the first synchronization clock, read, in each clock period of the first synchronization clock, the start code transmitted by the nonvolatile memory. The programmable logic device 402 is configured to under triggering of the first synchronization clock, read, in each clock period of the first synchronization clock, the configuration data transmitted by the nonvolatile memory. In this way, in each clock period of the first synchronization clock, both the nonvolatile memory and the processing module obtain respective data required for loading.

It may be understood that, under triggering of the first synchronization clock, when a rising edge or a falling edge of the first synchronization clock arrives, the nonvolatile memory obtains, from data stored in the nonvolatile memory, the start code that currently needs to be output to the processing module and the configuration data that currently needs to be output to the programmable logic device, and separately outputs the start code and the configuration data through different data interfaces at the same time. For example, if the nonvolatile memory outputs the start code and the configuration data when the rising edge of the first synchronization clock arrives, the processing module and the programmable logic device simultaneously obtains the start code or the configuration data from the nonvolatile memory when the falling edge after the rising edge arrives, or if the nonvolatile memory outputs the start code and the configuration data when the falling edge of the first synchronization clock arrives, the processing module and the programmable logic device receives the start code or the configuration data when the rising edge after the falling edge arrives. Therefore, the processing module and the programmable logic device simultaneously receive data output by the nonvolatile memory.

Optionally, to enable the nonvolatile memory to output data to a data interface in a timely manner when the rising edge or the falling edge of the first synchronization clock arrives, the nonvolatile memory may read one byte of data from an internal storage unit of the nonvolatile memory each time. In the one byte, the start code of the processing module and the configuration data of the programmable logic device are stored according to the following rule, one bit of start code is adjacent to one bit of configuration data of the programmable logic device, and at least one bit of configuration data corresponding to at least one programmable logic device is included between any two bits of start code.

For example, a new processing architecture includes one processing module and one programmable logic device. One byte includes eight bits, bit 0 to bit 7. In a first byte stored in the nonvolatile memory, bit 7 may be a first bit in a first byte in the configuration data of the programmable logic device, bit 6 may be a first bit in a first byte in the start code of the processing module, bit 5 is a second bit in the first byte in the configuration data of the programmable logic device, bit 4 is a second bit in the first byte in the start code of the processing module, and so on. In the first byte stored in the nonvolatile memory, bit 1 is a fourth bit in the first byte in the configuration data of the programmable logic device, and bit 0 is a fourth bit in the first byte in the start code of the processing module. Certainly, in another byte in the nonvolatile memory, one bit of configuration data of the programmable logic device and one bit of start code of the processing module are alternately stored.

Correspondingly, after the nonvolatile memory reads one byte of data each time, the one byte of data may be buffered. In this case, each time when data needs to be output to a data interface (for example, when a rising edge or a falling edge of a synchronization clock arrives), data that currently needs to be output may be extracted from the buffered one byte of data, and the data extracted from a buffer is output to the data interface.

Further, that the nonvolatile memory obtains, from the buffer of the nonvolatile memory when the rising edge or the falling edge of the first synchronization clock arrives, the start code that is currently to be output to the processing module and the configuration data that is to be output to the programmable logic device may further include obtaining a specific quantity of consecutive bits of to-be-output data from the buffer of the nonvolatile memory, where the specific quantity of bits of to-be-output data include one bit of start code corresponding to the processing module and at least one bit of configuration data corresponding to the at least one programmable logic device.

In a possible case, the specific quantity is the same as a total quantity of processing modules and programmable logic devices connected to the nonvolatile memory. For example, when the nonvolatile memory is connected to one processing module and one programmable logic device, the specific quantity is 2, and one bit of data in start code of the processing module and one bit of data in configuration data of the programmable logic device need to be consecutively read. When the nonvolatile memory is connected to one processing module and three programmable logic devices, the specific quantity is 4, and one bit of data in start code of the processing module and one bit of data in configuration data of each of the three programmable logic devices need to be consecutively read.

Optionally, in this application, the nonvolatile memory may have an SPI, for example, a flash memory has an SPI interface. The SPI interface of the nonvolatile memory may include a data line used for data exchange. The data line may also be referred to as an input/output pin. In this embodiment of this application, when the nonvolatile memory has the SPI interface, the processing module and the programmable logic device may be connected to different input/output pins in the SPI interface of the nonvolatile memory. In this case, the data interface described above is equivalent to the input/output pin.

Further, in this embodiment of this application, the nonvolatile memory supports an extended SPI protocol (extended SPI protocol). In this case, the SPI interface of the nonvolatile memory may have a plurality of input/output pins.

Correspondingly, to enable the processing module to send information such as a read command and a start address of a read operation to the nonvolatile memory, the processing module may be connected to a SPI module (not shown in the figure), and an input/output pin in the SPI module is connected to an input/output pin DQ0 in the SPI interface of the nonvolatile memory. Further, the SPI module connected to the processing module has a plurality of input/output pins (also referred to as input/output lines), and an input/output pin in the SPI module may be connected to the input/output pin DQ0 in the SPI interface of the nonvolatile memory. The processing module may receive, using the SPI module, the start code output by the nonvolatile memory using the input/output pin DQ0. Generally, the SPI interface of the nonvolatile memory has four input/output pins, and the four input/output pins are named as DQ0, DQ1, DQ2, and DQ3. Because the input/output pin DQ0 may be configured to transmit a read operation command and a start address, usually, an input/output pin in the peripheral interface module connected to the processing module is connected to the input/output pin DQ0 in the SPI interface of the nonvolatile memory.

The SPI module connected to the processing module may be packaged into a southbridge chip, or the SPI module and the processing module may be packaged into a chip. For example, the SPI module and the processing module are packaged into a processor chip.

However, because the programmable logic device does not need to send a read command to the nonvolatile memory, the programmable logic device may use a common interface. For example, a data loading interface used to load the configuration data may be disposed on the programmable logic device, and the data loading interface of the programmable logic device is connected to an input/output pin other than the pin DQ0 in the SPI interface of the nonvolatile memory. For ease of distinguishing, an input/output pin that is in the SPI interface of the nonvolatile memory and that is connected to the programmable logic device is referred to as a second pin. For example, the second pin may be one of the DQ1, the DQ2, and the DQ3 in the SPI interface of the nonvolatile memory. Correspondingly, the programmable logic device may obtain the configuration data output by the nonvolatile memory using the second pin. Further, the processing module may be further configured to, before the nonvolatile memory outputs the start code and the configuration data for the first time, send the read command and the start address of the read operation to the pin DQ0 in the nonvolatile memory such that the nonvolatile memory outputs the start code from the DQ0 and outputs the configuration data from the second pin according to the read command and the start address.

Optionally, the loading system in this embodiment of this application further includes a memory 404 connected to the processing module 401.

The processing module 401 is further configured to store the read start code in the memory 404, and run the start code in the memory when obtaining all start code required for starting the processing module 401.

Further, when all the start code required for starting the processing module is currently obtained, the processing module may directly run all the obtained start code in the memory, and then the processing module is started.

For ease of description, an example in which the processing module is packaged into the processor chip is used for description. A processor and an accelerator are carried on the board in the new processing architecture in this application. Optionally, after the board carrying the processor and the accelerator is powered on and reset, the processor and the memory need to be initialized first. To enable the processor to have a default start point during each start without being affected by an external memory, initialization on the processor and the memory may be completed using an instruction in a ROM in the processor. The processor is further configured to, before reading the start code transmitted by the nonvolatile memory, execute initialization code in the ROM in the processor to complete initialization on the processor and the memory.

Figure 5:
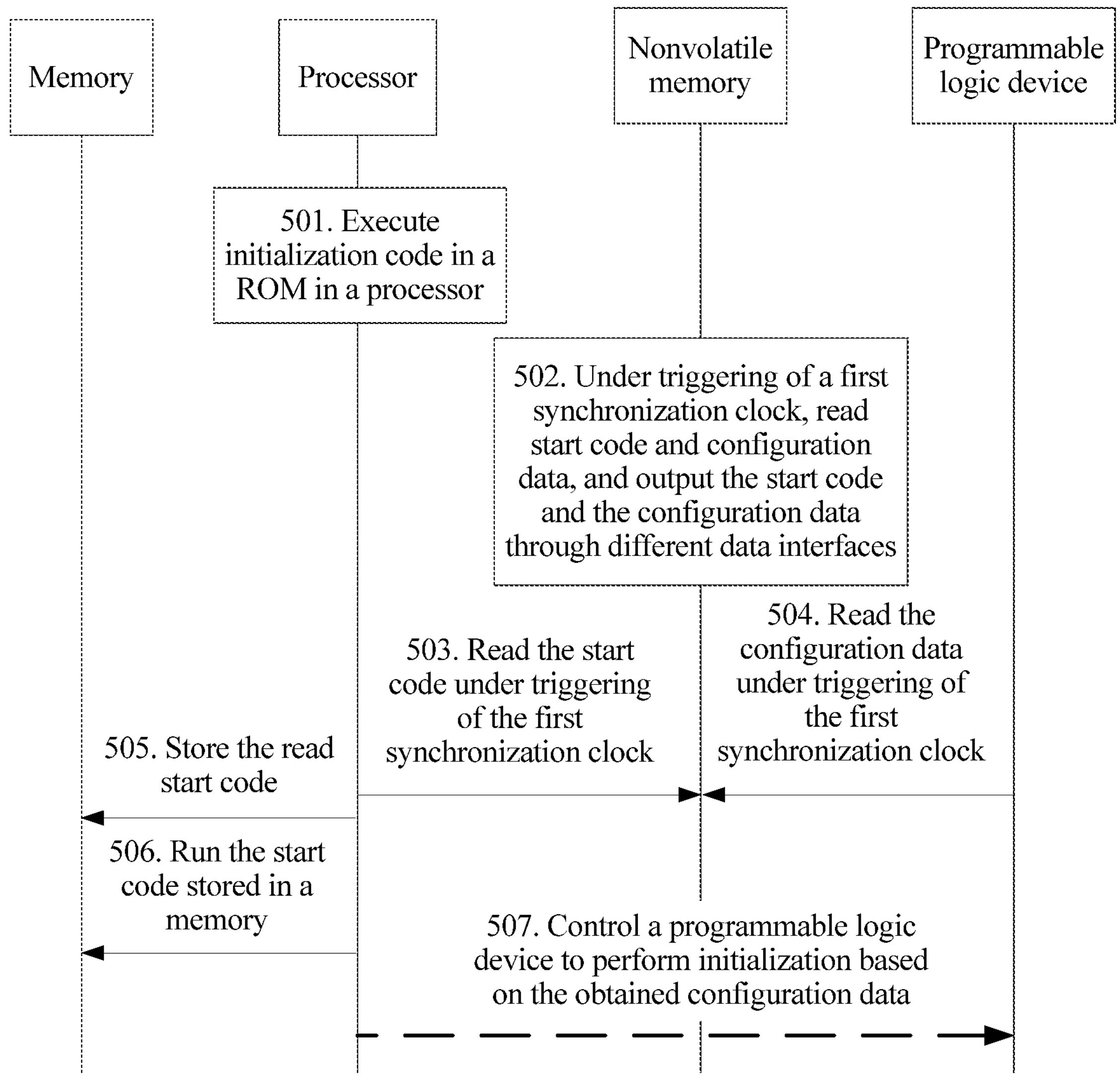
FIG. 5 is a schematic diagram of an interaction procedure of an embodiment of a data loading method according to this application.

Based on the data loading system shown in FIG. 4 and an example in which a processing module is packaged into a processor, an embodiment of this application further provides a data loading method. FIG. 5 is a schematic flowchart of an embodiment of a data loading method according to this application. The method in this embodiment may include the following steps.

Step 501. After a processor is powered on and reset, the processor executes initialization code in a ROM in the processor to complete initialization on the processor and a memory.

After a board carrying the processor and a programmable logic device is powered on and reset, the processor is also powered on and reset.

Working modes required by the processor, the memory, and the like may be modified by executing the code in the ROM. For example, a clock frequency run by the processor is modified, and working parameters of a memory controller and the memory may be further set. If error checking and correction (ECC) is enabled in the memory, content in a memory unit further needs to be reset.

Step 501 is an optional step, and does not belong to a data loading process.

Step 502. Under triggering of a first synchronization clock, a nonvolatile memory obtains, from a buffer of the nonvolatile memory, start code that is currently to be output to the processor and that is used to start the processor and configuration data that is currently to be output to a programmable logic device and that is used to configure the programmable logic device, transmits the start code to the processor through a data interface connected to the processor, and transmits the configuration data to the programmable logic device through a data interface connected to the programmable logic device.

Further, when a rising edge or a falling edge of the first synchronization clock arrives, the start code may be output to the data interface connected to the processor, and the configuration data is output to the data interface connected to the programmable logic device such that the nonvolatile memory simultaneously outputs the start code and the configuration data in each clock period of the first synchronization clock.

Step 503. Under triggering of the first synchronization clock, the processor reads the start code transmitted by the nonvolatile memory.

Step 504. Under triggering of the first synchronization clock, the programmable logic device reads the configuration data transmitted by the nonvolatile memory.

For example, if the nonvolatile memory outputs the start code and the configuration data when a falling edge of a synchronization clock arrives, when a rising edge of the synchronization clock arrives, the processor and the programmable logic device may respectively read the start code and the configuration data output by the nonvolatile memory. If the nonvolatile memory outputs the start code and the configuration data when the rising edge of the synchronization clock arrives, when the falling edge of the synchronization clock arrives, the processor and the programmable logic device are triggered to simultaneously read data output by the nonvolatile memory such that the processor reads the start code output by the nonvolatile memory, and the programmable logic device reads the configuration data output by the nonvolatile memory.

It should be noted that step 503 and step 504 are simultaneously performed. A person skilled in the art may understand that, "simultaneously" herein means that when the rising edge or the falling edge of the first synchronization clock arrives, the processor and the programmable logic device are simultaneously triggered to respectively perform step 503 and step 504. Certainly, in actual application, "simultaneously" may be understood as that steps are simultaneously performed in a same clock period of the first synchronization clock, and a specific offset is allowed.

Step 505. The processor stores the read start code in a memory.

It may be understood that before the processor obtains all start code, the processor repeatedly performs step 503 and step 505.

Step 506. The processor runs the start code in the memory when determining that all start code of the processor is currently obtained.

Steps 505 and 506 are optional steps. The processor directly stores the start code in the memory such that after all the start code is obtained, the processor directly runs the start code in the memory to increase a running speed.

Optionally, after step 504 in step 507, when the programmable logic device obtains all configuration data required by the programmable logic device, the processor may further control the programmable logic device to perform initialization based on the configuration data.

It may be understood that in this embodiment of this application, there may be a plurality of manners of generating the first synchronization clock.

In an example, the first synchronization clock may be a clock signal output by an internal clock of the processor. In this case, the processor may be further connected to a clock input port of the nonvolatile memory, and the processor is further connected to a clock loading interface of the programmable logic device. Correspondingly, the processor may output the clock signal of the processor to the clock input port of the nonvolatile memory and the clock loading interface of the programmable logic device such that the processor, the programmable logic device, and the nonvolatile memory read or output data based on the clock signal of the processor.

Optionally, when a processing module packaged into the processor is connected to a SPI module, the first synchronization clock may be an SPI synchronization clock, and the SPI module may be further configured to output the first synchronization clock under the control of the processing module.

Correspondingly, an SPI interface of the nonvolatile memory may include a clock input pin in addition to a plurality of data input/output pins used for data exchange (data lines from the SPI interface), and the clock input pin may also be referred to as a clock input line. In addition to an input/output pin, the SPI module connected to the processing module has a clock output pin, and the clock output pin in the SPI module is connected to the clock input pin in the SPI interface of the nonvolatile memory and the clock loading interface of the programmable logic device such that the nonvolatile memory and the programmable logic device can receive the first synchronization clock. In another example, the data loading system in this embodiment of this application may further include a clock processing logic circuit and an external clock module. The clock processing logic circuit may be connected to the processor into which the processing module is integrated and the external clock module. The clock processing logic circuit may select, based on a requirement, a clock signal that is input by the processor or the external clock module as a clock signal required by the data loading system, and output a synchronization clock to the programmable logic device and the nonvolatile memory based on the selected clock signal.

Figure 6:
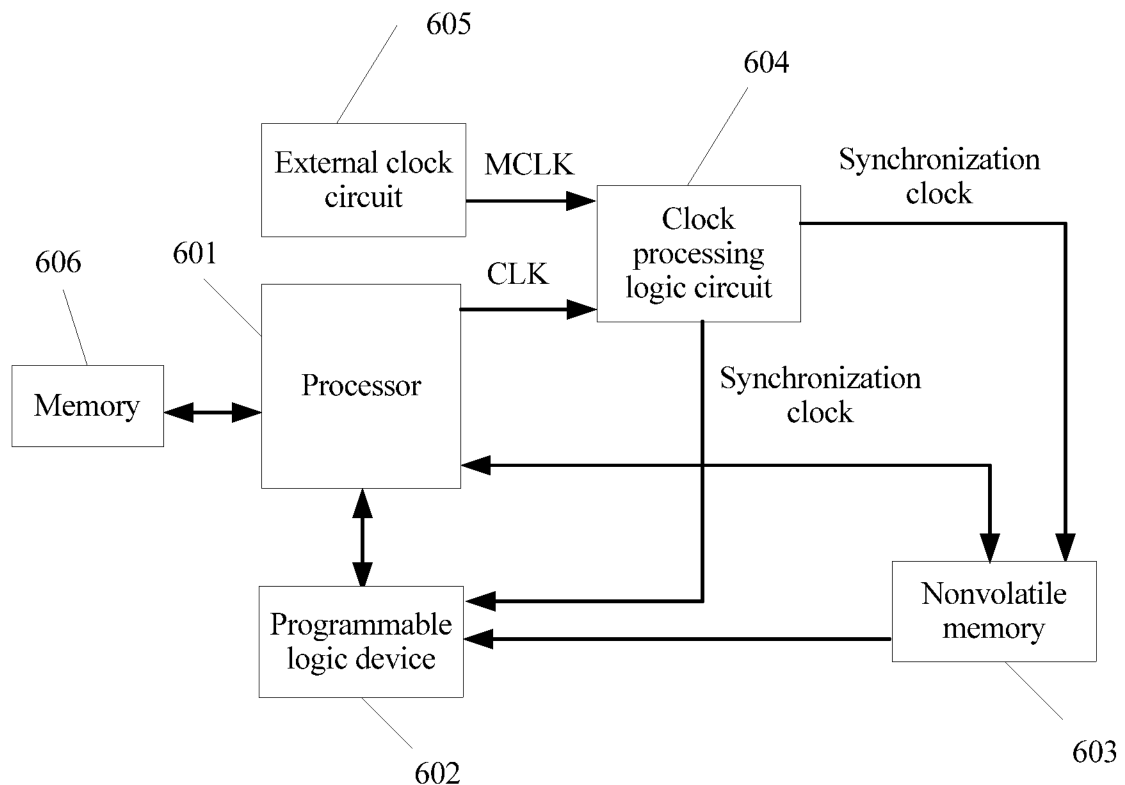
FIG. 6 is a schematic diagram of a hardware architecture of another embodiment of a data loading system according to this application.

For ease of understanding, an example in which a processing module and a SPI module connected to the processing module are packaged into a processor chip is used for description below. FIG. 6 is a schematic structural diagram of composition of another embodiment of a data loading system according to an embodiment of this application.

In this embodiment, the data loading system includes a processor 601, a programmable logic device 602, a nonvolatile memory 603, and a clock processing logic circuit 604 connected to the processor 601, the programmable logic device 602, and the nonvolatile memory 603.

In this embodiment, the processing module and the SPI module connected to the processing module described in the foregoing embodiment are packaged into the processor 601. The SPI module may output a first synchronization clock to the clock processing logic circuit under the control of the processing module. Therefore, the processor is configured to implement a related operation of the processing module described in the foregoing embodiment, and the processor is further configured to output, to the clock processing logic circuit 604, a first synchronization clock signal output by the SPI module. The first synchronization clock output by the SPI module is an SPI clock signal.

The clock processing logic circuit 604 is configured to divide the received first synchronization clock into two channels of synchronization clock, and simultaneously output the two channels of synchronization clock to the programmable logic device and the nonvolatile memory such that one first synchronization clock signal is input to each of the programmable logic device and the nonvolatile memory.

Optionally, the clock processing logic circuit 604 may divide the first synchronization clock into two channels of synchronization clock based on the received first synchronization clock, and separately output, to the nonvolatile memory and the programmable logic device, a synchronization clock whose clock frequency is the same as that of a clock signal of the processor.

Further, the clock processing logic circuit may separately generate two channels of synchronization clock based on the first synchronization clock output by the processor. Both clock frequencies of the two clock signals are the same as a clock frequency of a first clock output by the processor. In addition, the clock processing logic circuit outputs one of the two channels of synchronization clock to the nonvolatile memory, and outputs the other synchronization clock to the programmable logic device.

Correspondingly, the synchronization clock received by the nonvolatile memory is the synchronization clock output by the clock processing logic circuit, and the programmable logic device also reads, based on the synchronization clock output by the clock processing logic circuit, configuration data transmitted by the nonvolatile memory.

In this embodiment, the clock processing logic circuit may be implemented using a complex programmable logic device (CPLD) or a private circuit, and this is not limited herein.

It may be understood that, generally, a data volume of start code of the processor is greater than a data volume of configuration data required by the programmable logic device. In this case, duration required by the processor for data loading is longer than duration required by the programmable logic device for data loading. However, in a process of loading the start code, the processor always outputs the first synchronization clock such that the entire data loading system can output and read data based on the first synchronization clock, and complete data loading on the processor and all programmable logic devices.

However, in some special cases, the data volume of the configuration data of the programmable logic device may be greater than the data volume of the start code of the processor such that the duration required by the processor for data loading is shorter than the duration required by the programmable logic device for data loading. In this case, when completing loading of the start code, the processor no longer outputs the first synchronization clock. Further, after the processing module packaged into the processor obtains all start code required for start, the processing module controls the SPI module to stop outputting the first synchronization clock. Correspondingly, after the processor obtains all the required start code, the nonvolatile memory and the programmable logic device cannot output or read data based on the first synchronization clock. To resolve this problem, the data loading system may further include an external clock circuit 605 connected to the clock processing logic circuit. Optionally, the external clock circuit may be an external SPI clock module.

The external clock circuit may output a second synchronization clock to the clock processing logic circuit, and when the external clock circuit is the external SPI clock module, the second synchronization clock is an SPI synchronization clock. A clock frequency of the second synchronization clock may be the same as that of the first synchronization clock, or may be different from that of the first synchronization clock. Further, this may depend on requirements of the nonvolatile memory and the programmable logic device on a clock frequency.

To enable the clock processing logic circuit to determine to be currently switched to receive the second synchronization clock output by the external clock circuit, optionally, in this embodiment of this application, the programmable logic device is further configured to when determining that all configuration data required for configuring the programmable logic device is currently obtained, output a loading completion indication to the clock processing logic circuit, and the loading completion indication is used to indicate that the programmable logic device currently obtains all the required configuration data.

Correspondingly, the clock processing logic circuit is further configured to, when the processor obtains all the start code, and the programmable logic device does not send the loading completion indication, receive the second synchronization clock output by the external clock circuit, divide the second synchronization clock into two channels of synchronization clock, and simultaneously output the two channels of synchronization clock to the nonvolatile memory and the programmable logic device such that each of the programmable logic device and the nonvolatile memory can receive one synchronization clock. Optionally, the clock processing logic circuit may generate, based on the second synchronization clock, two channels of synchronization clock whose clock frequencies are the same as that of a clock signal of the second synchronization clock.

It can be learned that when the processor stops outputting the first synchronization clock, the synchronization clocks received by the programmable logic device and the nonvolatile memory are synchronization clocks generated based on the second synchronization clock output by the external clock circuit. In FIG. 6, CLK represents the first synchronization clock output by the processor, and MCLK represents the second synchronization clock output by the external clock circuit.

The first synchronization clock and the second synchronization clock are merely used to distinguish a synchronization clock output by the processor from a synchronization clock output by the external clock circuit. There may be a plurality of manners of determining, by the clock processing logic circuit, that the processor obtains all the start code.

For example, after obtaining all the start code, the processor may send an indication signal to the clock processing logic circuit, to notify, using the indication signal, the clock processing logic circuit of information indicating that the processor obtains all the start code.

For another example, the clock processing logic circuit may detect whether the first synchronization clock output by the processor can be currently received. If the first synchronization clock output by the processor is not received during specific duration, the clock processing logic circuit determines that the processor obtains all the start code, and no longer outputs a clock signal.

It should be noted that the nonvolatile memory stores a total data volume of the start code required for starting the processor, and the processor may read the total data volume of the start code from the nonvolatile memory in advance. In this way, the processor may determine, based on the total data volume, whether all the start code is currently obtained. Correspondingly, the programmable logic device may also preset a total data volume of the configuration data that needs to be configured, and detect, based on the total data volume of the configuration data, whether all the configuration data is currently obtained.

It may be understood that in an implementation, when determining that the processor obtains all the start code, and the programmable logic device does not send the loading completion indication, the clock processing logic circuit is switched to receive the external clock circuit. In actual application, alternatively, the processing module in the processor may trigger the clock processing logic circuit to perform synchronization clock switching. Further, when obtaining all the start code, the processing module packaged into the processor may determine whether the programmable logic device loads all the configuration data. Correspondingly, when the processing module determines that the programmable logic device does not load all the configuration data, the clock processing logic circuit may receive the second synchronization clock output by the external clock circuit, divide the second synchronization clock into two channels of synchronization clock, and simultaneously output the two channels of synchronization clock to the programmable logic device and the nonvolatile memory.

There may also be a plurality of manners of determining, by the processor, whether the programmable logic device loads all the configuration data. For example, the processor may detect whether the clock processing logic circuit receives the loading completion indication sent by the programmable logic device. If the programmable logic device does not send the loading completion indication to the clock processing logic circuit when the processor obtains all the start code, the processor may send an instruction signal to the clock processing logic circuit, to instruct the clock processing logic circuit to be switched to receive the second synchronization clock output by the external clock circuit.

It may be understood that in FIG. 6, an example in which the data loading system includes one programmable logic device is used for description. In actual application, the data loading system may include a plurality of programmable logic devices, different programmable logic devices are connected to different second pins of the nonvolatile memory, and programmable logic devices are separately connected to different pins of the clock processing logic circuit. Correspondingly, the clock processing logic circuit may divide the received first synchronization clock or the second synchronization clock into a corresponding quantity of synchronization clocks based on a total quantity of programmable logic devices and nonvolatile memories included in the data loading system. For example, when there are two programmable logic devices, the total quantity of programmable logic devices and nonvolatile memories in the data loading system is three, and the clock processing logic circuit may divide the first synchronization clock into three synchronization clocks, and separately output the three synchronization clocks to the nonvolatile memory and the two programmable logic devices.

Correspondingly, if there is a plurality of programmable logic devices, when the processor obtains all the start code, the clock processing logic circuit only needs to be switched to receive the second synchronization clock provided that the programmable logic device does not obtain all the configuration data required by the programmable logic device. Optionally, in the embodiment shown in FIG. 6, the data loading system may also include a memory 605 connected to the processor. In this case, the processor may store the read start code in the memory, and directly run the start code in the memory when obtaining all the start code. Correspondingly, that the processor obtains all the start code may be understood as that the processor loads all the start code into the memory.

Optionally, in this embodiment, to avoid a case in which remained configuration data in last data loading exists in the programmable logic device, the clock processing logic circuit is further configured to, before receiving the first synchronization clock output by the processor, send a configuration clear instruction to the programmable logic device, and the configuration clear instruction is used to instruct the programmable logic device to clear the configuration data in the programmable logic device.

Further, considering that the programmable logic device needs to perform reloading only when the programmable logic device is powered on again, if a board carrying the processor and the programmable logic device performs only hot start, the configuration data of the programmable logic device is not lost, and the programmable logic device does not need to reload the configuration data. However, the clock processing logic circuit may identify cold start or hot start, and therefore the clock processing logic circuit is further configured to send the configuration clear instruction to the programmable logic device when detecting that the board on which the processor and at least one programmable logic device are located performs cold start. Certainly, the clock processing logic circuit outputs a synchronization clock to the programmable logic device only when determining that the board performs cold start. If the board performs hot start, the clock processing logic circuit does not need to output a synchronization clock to the programmable logic device, and the programmable logic device does not need to perform reloading.

It should be noted that, for a process in which the nonvolatile memory simultaneously reads the start code and the configuration data such that the processing module and the programmable logic device in the processor respectively obtains the start code and the configuration data from the nonvolatile memory at the same time, refer to the related descriptions in the foregoing embodiment. Details are not described herein again.

It may be understood that, in this embodiment of this application, the nonvolatile memory also has an SPI interface. Details are similar to those described in the foregoing embodiment.

In this embodiment, one clock input port of the clock processing logic circuit is connected to a clock output pin in the SPI module packaged into the processor, and the other clock input port of the clock processing logic circuit is connected to a clock output pin in the external clock circuit. In addition, the clock processing logic circuit further includes at least two clock output ports. A clock input pin in the SPI interface of the nonvolatile memory and a clock loading interface of the programmable logic device are separately connected to different clock output ports of the logic circuit.

Further, when the processing module is packaged into the processor, the processor may further control the nonvolatile memory to output data from input/output ports. Further, the SPI interface works in a primary-secondary mode, and four signals are included.

CLK: A clock signal. The clock signal is sent by a primary device to a secondary device, and provides a transmission synchronization function of command, address, and data. An input command, an input address, and input data are sampled by the secondary device on a rising edge of the CLK (namely, a write operation), and data is output on a falling edge of the CLK (namely, a read operation).

MOSI: A command, an address, or data output by the primary device to the secondary device. A high bit precedes a low bit.

MISO: Data sent by the secondary device to the primary device. A high bit precedes a low bit.

CS: A chip select signal sent by the primary device to the secondary device. A low level is active.

Figure 7:
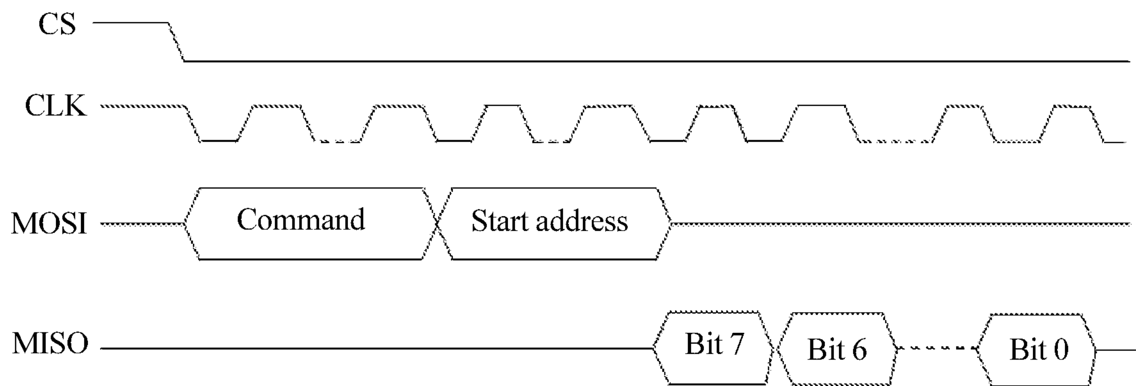
FIG. 7 is a schematic diagram of a time sequence of a read operation of an SPI.

FIG. 7 is a schematic diagram of a time sequence of a read operation of an SPI interface. For the read operation, when a primary device accesses a secondary device, the primary device first sends a command, and then sends a start address, and finally the secondary device continuously outputs data. In this embodiment of this application, in a process of performing the read operation, the primary device is a processor, and the secondary device may be a nonvolatile memory.

When the nonvolatile memory supports an extended SPI protocol, an SPI of the nonvolatile memory may include a plurality of input/output pins used for data exchange. Further, the nonvolatile memory may have four input/output pins. The four input/output pins are defined as DQ0, DQ1, DQ2, and DQ3, and the nonvolatile memory may output data from one, two, or four input/output pins.

Certainly, in this embodiment of this application, at least two input/output pins in the SPI interface of the nonvolatile memory are separately connected to the processor and at least one programmable logic device. Therefore, in this embodiment of this application, the processor may control the nonvolatile memory to simultaneously output data from the two or four input/output pins. Further, the nonvolatile memory may determine, according to a read command of the processor (or a processing module in the processor), to output data from input/output pins. Therefore, before the nonvolatile memory outputs start code and configuration data for the first time, the processor may further send a corresponding read command to the nonvolatile memory using the input/output pin DQ0 connected to the nonvolatile memory. The read command may be a dual output fast read (dual output fast read) command or a quad output fast read command.

When the nonvolatile memory is connected to one processor and one programmable logic device, in an implementation, the processor may send the dual output fast read command to the nonvolatile memory. In this case, the nonvolatile memory outputs data from only two input/output pins. The two input/output pins are the pin DQ0 that is connected to the processor in the SPI interface of the nonvolatile memory and an input/output pin that is other than the pin DQ0 and that is connected to the programmable logic device. For example, the input/output pin DQ0 in the nonvolatile memory is connected to an input/output pin in a SPI module packaged into the processor, and the input/output pin DQ1 in the nonvolatile memory is connected to one programmable logic device. In this way, under triggering of a synchronization clock, the nonvolatile memory simultaneously obtains one bit of start code of the processor and one bit of configuration data of the programmable logic device, outputs the one bit of start code to the DQ0, and outputs the one bit of configuration data from the DQ1.

Figure 8:
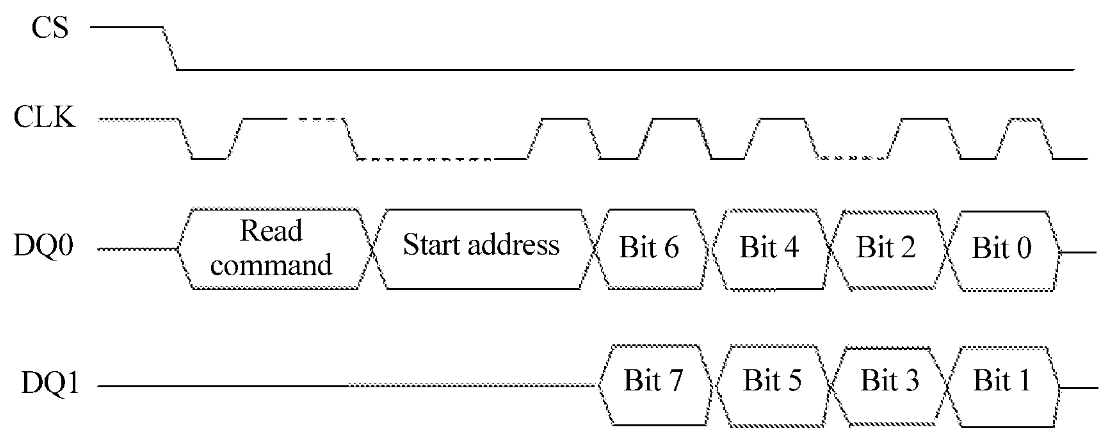
FIG. 8 is a schematic diagram of a time sequence of a read operation when a command output by a processor to a nonvolatile memory is a dual output fast read command.

FIG. 8 is a schematic diagram of a time sequence of a read operation when a command output by a processor to a nonvolatile memory is a dual output fast read command.

It can be learned from FIG. 8 that after the processor sends a valid chip select signal to the nonvolatile memory, the nonvolatile memory is selected, and after the processor sends the dual output fast read command and a start address of the read operation, the nonvolatile memory reads data based on the start address. It should be noted that the nonvolatile memory reads one byte of data from an internal storage unit each time, and buffers the read one byte of data. When the nonvolatile memory needs to output data to an input/output pin, the nonvolatile memory may read, from the buffered one byte, two bits of data that currently need to be output. If all bits of data in the current buffered one byte are output, the nonvolatile memory may read one byte of data from the internal storage unit again and buffer the one byte of data, and repeat the operations until all data in the internal storage unit is read and output.

One bit of start code and one bit of configuration data are alternately stored in the one byte of data that is read each time. For example, one byte usually includes eight bits, and the eight bits are sequentially bit 7, bit 6, bit 5, bit 4, bit 3, bit 2, bit 1, and bit 0 from a high bit to a low bit. That is, one byte includes eight bits, bit 7 to bit 0. Bit 7 in the one byte is used to store configuration data, and bit 6 is used to store start code. Correspondingly, bit 5 is used to store configuration data, bit 4 is used to store start code, and so on. Bit 3 and bit 1 are used to store configuration data, and bit 2 and bit 0 store are used to store start code. Further, before all start code required for starting the processor and all configuration data required by a programmable logic device are stored in the nonvolatile memory, all the start code and all the configuration data may be separately divided such that the start code and the configuration data are separately divided into a plurality of bits of data segments. Each data segment that is obtained by dividing the start code corresponds to one bit of start code, and each data segment that is obtained by dividing the configuration data corresponds to one bit of configuration data. Then the one bit of configuration data and the one bit of start code are alternately stored in the nonvolatile memory.

When the start code and the configuration data are alternately stored, an input/output pin DQ0 in an SPI interface of the nonvolatile memory is connected to an input/output pin in a SPI module packaged into the processor, and an input/output pin DQ1 in the SPI interface of the nonvolatile memory may be connected to a data loading interface of the programmable logic device. It can be learned from FIG. 8 that after receiving the dual output fast read command, under triggering of a synchronization clock (the synchronization clock may be a first synchronization clock or a second synchronization clock), the nonvolatile memory separately outputs two consecutive bits of data in the one byte to the DQ0 and the DQ1. It can be learned from FIG. 8 that under triggering of the synchronization clock, the DQ0 and the DQ1 simultaneously output data each time such that the processor and the programmable logic device receive the start code or the configuration data in a same clock period. For example, when outputting the configuration data in bit 7 using the DQ1, the nonvolatile memory outputs the start code in bit 6 using the DQ0, and so on.

When the nonvolatile memory is merely connected to one processor and one programmable logic device, in another implementation, a command sent by the processor may alternatively be a quad output fast read (quad output fast read) command. For example, the processor sends the command and a start address to the nonvolatile memory using DQ0. In this case, the nonvolatile memory simultaneously outputs data from four input/output pins, to be specific, outputs data from DQ0, DQ1, DQ2, and DQ3. However, because only two input/output pins in the nonvolatile memory are separately connected to the processor and the programmable logic device, and the other two input/output pins are connected to no programmable logic device, the nonvolatile memory may output invalid data to an input/output pin that is connected to no processor or programmable logic device.

Optionally, the nonvolatile memory may store data in the following manner.

Each byte includes two data zones, each data zone includes four consecutive bits of data, and the four consecutive bits of data include one bit of start code of the processor, one bit of configuration data of the programmable logic device, and two bits of invalid data. That is, one bit of configuration data of the programmable logic device and two bits of invalid data are included between two bits of start code of the processor in each byte.

In this way, under triggering of the synchronization clock, the nonvolatile memory obtains, from a buffer, four consecutive bits of data corresponding to one data zone each time and output the four consecutive bits of data.

Certainly, a sequence of start code, configuration data, and invalid data in four consecutive bits of data corresponding to one data zone is related to an input/output pin that is in the nonvolatile memory and that is connected to the processor and the programmable logic device. It may be understood that when a read command received by the nonvolatile memory is the quad output fast read command, the nonvolatile memory simultaneously outputs data from the DQ3, the DQ2, the DQ1, and the DQ0. Each bit in each byte stored in the nonvolatile memory corresponds to one input/output pin in the SPI interface of the nonvolatile memory, that is, data in a bit in each byte is fixedly output from one input/output pin in the SPI interface of the nonvolatile memory. Further, data in bit 7 and data in bit 3 in each byte are output from the DQ3 in the SPI interface of the nonvolatile memory. Data in bit 6 and data in bit 2 in each byte are output from the DQ2. Data in bit 5 and data in bit 1 in each byte are output from the DQ1. Data in bit 4 and data in bit 0 in each byte are output from the DQ0.

Because the processor is connected to the DQ0 in the SPI interface of the nonvolatile memory, and bit 4 and bit 0 in each byte are fixedly output from the pin DQ0, bit 4 and bit 0 in each byte are used to store one bit of start code. A second pin that is connected to the programmable logic device and that is in the SPI interface of the nonvolatile memory may be any one of the DQ1, the DQ2, and the DQ3. Therefore, a bit corresponding to the second pin in each byte may be used to store the configuration data.

For example, when the DQ0 in the nonvolatile memory is connected to the processor, the DQ1 is connected to the programmable logic device, and the DQ2 and the DQ3 are connected to no programmable logic device, in an example in which each byte includes eight bits bit 0 to bit 7, if one byte may be divided into two data zones, bit 7 to bit 4 belong to one data zone, and bit 3 to bit 0 belong to the other data zone. In the data zone including bit 7 to bit 4, because data in bit 7 is fixedly output from the DQ3, data in bit 6 is output from the DQ2, data in bit 5 is output from the DQ1, and data in bit 4 is output from the DQ0. Correspondingly, in the data zone including bit 3 to bit 0, data in bit 3 to bit 0 is sequentially output from the DQ3, the DQ2, the DQ1, and the DQ0. Therefore, the nonvolatile memory may store data in one byte in the following manner.

Bit 7 to bit 4 in one byte belong to a data zone, each of bit 7 and bit 6 is used to store one bit of invalid data, bit 5 is used to store one bit of configuration data of the programmable logic device, and bit 4 is used to store one bit of start code of the processor. Correspondingly, bit 3 to bit 0 belong to a data zone, each of bit 3 and bit 2 is used to store one bit of invalid data, bit 1 is used to store one bit of configuration data of the programmable logic device, and bit 0 is used to store one bit of start code of the processor.

In this case, the nonvolatile memory reads one byte of data from the internal storage unit each time and buffers the one byte of data. The one byte of data includes two data zones. Therefore, actually, data corresponding to the two data zones is separately output in two clock periods of the synchronization clock. Further, when detecting that a falling edge of the synchronization clock arrives, the nonvolatile memory may obtain four consecutive bits of data corresponding to a current to-be-output data zone in the buffered one byte. If bit 7, bit 6, bit 5, and bit 4 currently need to be output, data stored in bit 7, bit 6, bit 5, and bit 4 in the byte is obtained from the buffered one byte, and data in bit 7 is output from the DQ3, data in bit 6 is output from the DQ2, data in bit 5 is output from the DQ1, and bit 4 is output from the DQ0. Therefore, the processor may obtain the start code from the DQ0, the programmable logic device obtains the configuration data from the DQ1, and invalid data is output from the DQ2 and the DQ3.

Particularly, when the nonvolatile memory is connected to one processor and at least two programmable logic devices, the nonvolatile memory needs to ensure that three input/output pins that are connected to the processor and the programmable logic device simultaneously output data, and therefore the processor can output the quad output fast read command only to the nonvolatile memory, to control the nonvolatile memory to simultaneously output data to the four input/output pins.

When the nonvolatile memory is connected to one processor and two programmable logic devices, one input/output pin in the SPI interface of the nonvolatile memory is connected to no programmable logic device. In this case, data that is output by the nonvolatile memory to the input/output pin that is connected to no programmable logic device may be invalid data. Optionally, the nonvolatile memory may store data in the following manner.

One byte includes two data zones. Each data zone corresponds to four consecutive bits of data. The four consecutive bits of data in each data zone include one bit of configuration data corresponding to each of the two programmable logic devices, one bit of invalid data, and one bit of start code of the processor.

In each byte in the nonvolatile memory, data in bit 7 needs to be output from the data input/output pin DQ3, data in bit 6 needs to be output from the data input/output pin DQ2, data in bit 5 needs to be output from the data input/output pin DQ1, data in bit 4 needs to be output from the data input/output pin DQ0, and correspondingly, data in bit 3 to bit 0 is sequentially output from the DQ3 to the DQ0. In addition, the input/output pin DQ0 needs to be connected to an input/output pin in the SPI module packaged into the processor, to receive, using the DQ0, a read operation command and a read start address that are output by the processor. Therefore, for four consecutive bits of data corresponding to each data zone, start code needs to be located in a last bit in the four consecutive bits of data, and a sequence of configuration data and invalid data is related to a manner of connecting a data input/output pin in the nonvolatile memory to the programmable logic device.

Correspondingly, if the nonvolatile memory is connected to one processor and three programmable logic devices, a storage form of data in the nonvolatile memory may be that one byte includes two data zones, each data zone corresponds to four consecutive bits of data, and the four consecutive bits of data include one bit of start code of the processor and one bit of configuration data corresponding to each of the three programmable logic devices.

Figure 9:
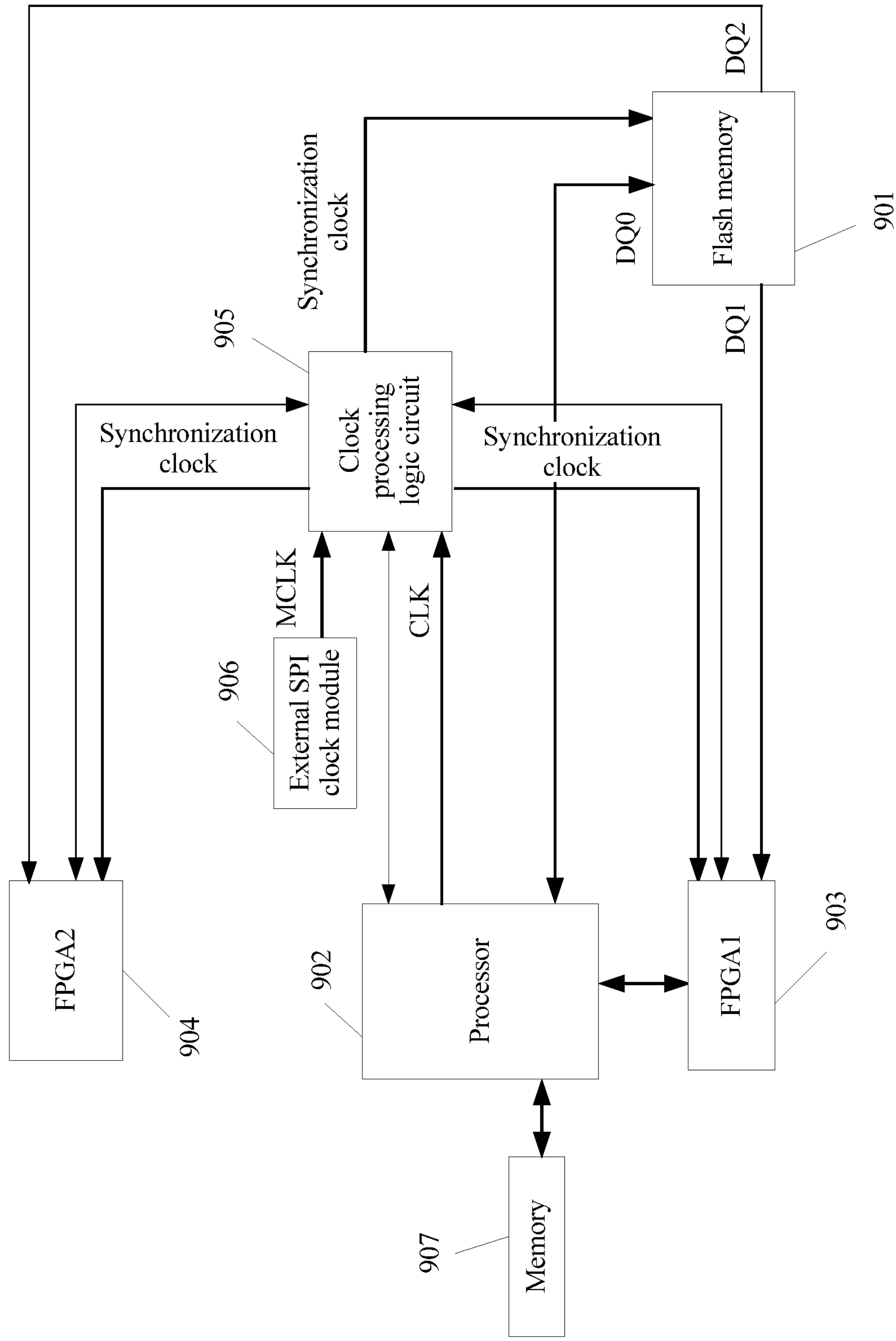
FIG. 9 is a schematic diagram of a hardware architecture of another embodiment of a data loading system according to this application.

For ease of understanding, an example in which a nonvolatile memory is a flash memory, a programmable logic device is an FPGA, and a flash memory is connected to two FPGAs is used for description. FIG. 9 is a schematic structural diagram of composition of another embodiment of a data loading system according to this application.

In FIG. 9, an example in which a processing module and an SPI module are packaged into a processor chip, and the flash memory has an SPI interface is used for description.

A flash memory 901 supports an extended SPI protocol, and an SPI interface of the flash memory has four input/output pins that are named as DQ0, DQ1, DQ2, and DQ3. The input/output pin DQ0 is connected to an input/output pin in an SPI interface of a processor 902, the input/output pin DQ1 of the flash memory 901 is connected to a data loading interface of an FPGA 903, and the input/output pin DQ2 of the flash memory 901 is connected to a data loading interface of the other FPGA 904. For ease of distinguishing of the two FPGAs, the two FPGAs are separately referred to as an FPGA1 and an FPGA2.

In addition, the SPI interface of the flash memory 901 further has one clock input pin.

A clock output pin in the SPI interface of the processor 902 is connected to one clock input port of a clock processing logic circuit 905, and the other clock input port of the clock processing logic circuit 905 is connected to a clock output port of an external SPI clock module 906. Three clock output ports of the clock processing logic circuit 605 are separately connected to a clock input pin in the flash memory 901, a clock loading interface of the FPGA1 903, and a clock loading interface of the FPGA2 904. As shown in FIG. 9, a synchronization clock input by the processor 902 to the clock processing logic circuit 905 is referred to as a CLK, and a synchronization clock input by the external SPI clock module 906 to the clock processing logic circuit 905 is referred to as an MCLK. The clock processing logic circuit 905 may select, based on a requirement, either of the two channels of synchronization clock as an input synchronization clock, generate, based on a currently selected synchronization clock signal, three synchronization clocks whose frequencies are the same as that of the selected input synchronization clock, and separately output the three synchronization clocks to the flash memory 901, the FPGA1 903, and the FPGA2 904.

In addition, to implement information exchange between the processor 902 and the clock processing logic circuit 905, a signal interaction port of the processor 902 is further connected to a signal interaction port of the clock processing logic circuit 905. For example, the clock processing logic circuit 905 may be connected to a local bus of the processor 902. In this way, the processor 902 may access a register in the logic circuit to control a working mode of the clock processing logic circuit 905 (for example, clock signal switching), or read a loading completion indication signal of an FPGA received by the clock processing logic circuit 905.

Correspondingly, another signal interaction port of the clock processing logic circuit 905 is connected to a signal interaction port of the FPGA1 903, and still another signal interaction port of the clock processing logic circuit 905 is connected to a signal interaction port of the FPGA2 904 to implement signal interaction between the clock processing logic circuit 905 and each of the FPGA1 903 and the FPGA2 904. For example, the clock processing logic circuit may send, to an FPGA, an instruction signal PROGRAM that is used to instruct the FPGA to clear configuration data in the FPGA.

Similar to the foregoing embodiment, in this embodiment, the processor 902 is further connected to a memory 907.

It may be understood that in this embodiment, to enable the flash memory to simultaneously output data to the DQ0, the DQ1, and the DQ2 that are respectively connected to the processor, the FPGA1, and the FPGA2, the processor needs to send a quad output fast read command to the flash memory. In this way, after receiving the quad output fast read command, the flash memory simultaneously outputs data from the DQ0, the DQ1, the DQ2, and the DQ3, and because the DQ3 is not connected to any component, it may be specified that the flash memory outputs invalid data to the DQ3.

To enable the flash memory to simultaneously output data to the DQ3, the DQ2, the DQ1, and the DQ0, the flash memory may store data in the following form.

Each byte includes two data zones. Each data zone corresponds to four consecutive bits of data. The four consecutive bits of data corresponding to each data zone are sequentially one bit of invalid data, one bit of configuration data of the FPGA2, one bit of configuration data of the FPGA1, and one bit of start code.

For example, if the DQ0, the DQ1, and the DQ2 in the SPI interface of the flash memory are respectively connected to the processor, the FPGA1, and the FPGA2, bit 7 and bit 3 in each byte may be used to store the invalid data, bit 6 and bit 2 may be used to store the configuration data of the FPGA2, bit 5 and bit 1 may be used to store the configuration data of the FPGA1, and bit 4 and bit 0 may be used to store the start code of the processor.

In actual application, a file of the start code of the processor and a file in which the configuration data of the FPGA1 and the configuration data of the FPGA2 are located may be divided in advance, and then files are reconstructed based on the foregoing storage form. In this way, one byte of data that is read each time includes the start code of the processor, the configuration data of the FPGA1, and the configuration data of the FPGA2. Further, each time when four consecutive bits of data corresponding to a data zone are extracted from one byte, the four consecutive bits of data corresponding to the data zone may be sequentially one bit of invalid data, one bit of configuration data of the FPGA2, one bit of configuration data of the FPGA1, and one bit of start code of the processor. The invalid data may be replaced with all 0s or all 1s.

It may be understood that, because a data volume of the start code of the processor is not totally the same as a data volume of the configuration data of each of the FPGA1 and the FPGA2, in a process of alternatively storing the start code of the processor, the configuration data of the FPGA1, and the configuration data of the FPGA2, all data in a file of the processor or an FPGA may be stored in the flash memory. However, not all data that needs to be configured for a component is stored in the flash memory. For example, when the data volume of the processor is relatively large, after the configuration data of the FPGA1 and the configuration data of the FPGA2 are divided and stored in the flash memory based on the foregoing data storage form, some start code of the processor is not stored. To ensure that each data zone still corresponds to four bits of data of four data input/output pins, if all data that needs to be configured for a component is stored in the flash memory, bits corresponding to the component and that are in a data zone in which storage is not performed may be replaced with all 0 or all 1, but a bit of another component is still used to store data of the other component.

For example, it is assumed that there are 100 bits of start code of the processor, 80 bits of configuration data of the FPGA1, and 95 bits of configuration data of the FPGA2. Based on a manner in which one byte corresponds to two data zones, and in four consecutive bits corresponding to each data zone, a first bit is invalid data, a second bit is one bit of configuration data of the FPGA2, a third bit is one bit of configuration data of the FPGA1, and a fourth bit is one bit of start code, the start code of the processor, the configuration data of the FPGA1, and the configuration data of the FPGA2 are alternatively stored in an internal storage unit of the flash memory. In this way, the start code of the processor needs to be distributed to 100 data zones (namely, 50 bytes), the configuration data of the FPGA1 needs to be distributed to 80 data zones (namely, 40 bytes), and the configuration data of the FPGA2 needs to be distributed to 95 data zones (namely, 48 bytes). In this case, if data is stored in descending order of bits from a high bit to a low bit, a first storage area in a first byte corresponds to four bits bit 7 to bit 4. In this case, bit 7 is used to store one bit of invalid data, bit 6 is used to store one bit of configuration data of the FPGA2, bit 5 is used to store one bit of configuration data of the FPGA1, and bit 4 is used to store one bit of start code. Bit 3 to bit 0 corresponding to a second data zone in the first byte are used to store data based on this sequence. In this way, when storage in an $80^{th}$ storage area corresponding to a $40^{th}$ byte is performed, all the configuration data of the FPGA1 is stored in the flash memory, but some start code of the processor and some configuration data of the FPGA2 are not stored in the flash memory. In this case, all bits used for storing the configuration data of the FPGA1 may be set to 0 or 1 from a $41^{st}$ byte. For example, bit 5 and bit 1 in the $41^{st}$ byte are bits that originally need to be used to store the configuration data of the FPGA1, and therefore data in bit 5 and bit 1 is stored as 0, bit 7 and bit 3 are still used to store the invalid data (for example, all 0s or 1s), bit 6 and bit 2 are still used to separately store one bit of configuration data of the FPGA2, and bit 4 and bit 0 are still used to separately store one bit of start code of the processor. Correspondingly, data in both bit 5 and bit 1 in a $42^{nd}$ byte is stored as 0. When storage in a first data zone in a $48^{th}$ byte is performed, all the configuration data of the FPGA2 is also stored in the flash memory. In this way, all bits that originally need to be used to store the configuration data of the FPGA2 are stored as 0 or 1 from a second data zone in the $48^{th}$ byte.

It may be understood that the SPI interface of the flash memory further has a chip select input pin. One pin in the processor is connected to the chip select input pin (not shown in FIG. 9) in the flash memory, and the processor may input a valid chip select signal to the flash memory using the chip select input pin.

Figure 10A:
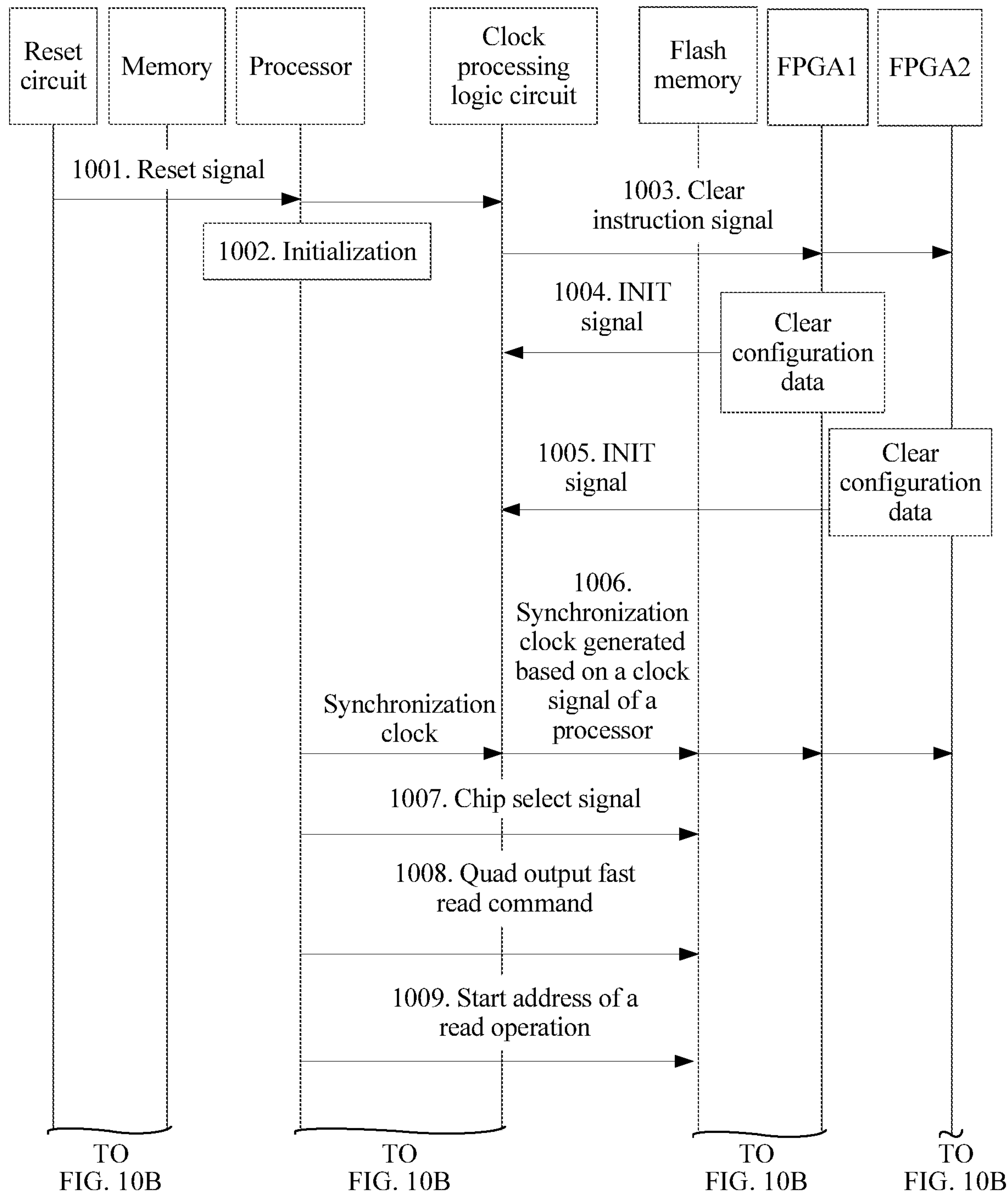
FIG. 10A and FIG. 10B are a schematic diagram of an interaction procedure of another embodiment of a data loading method according to this application.
Figure 10B:
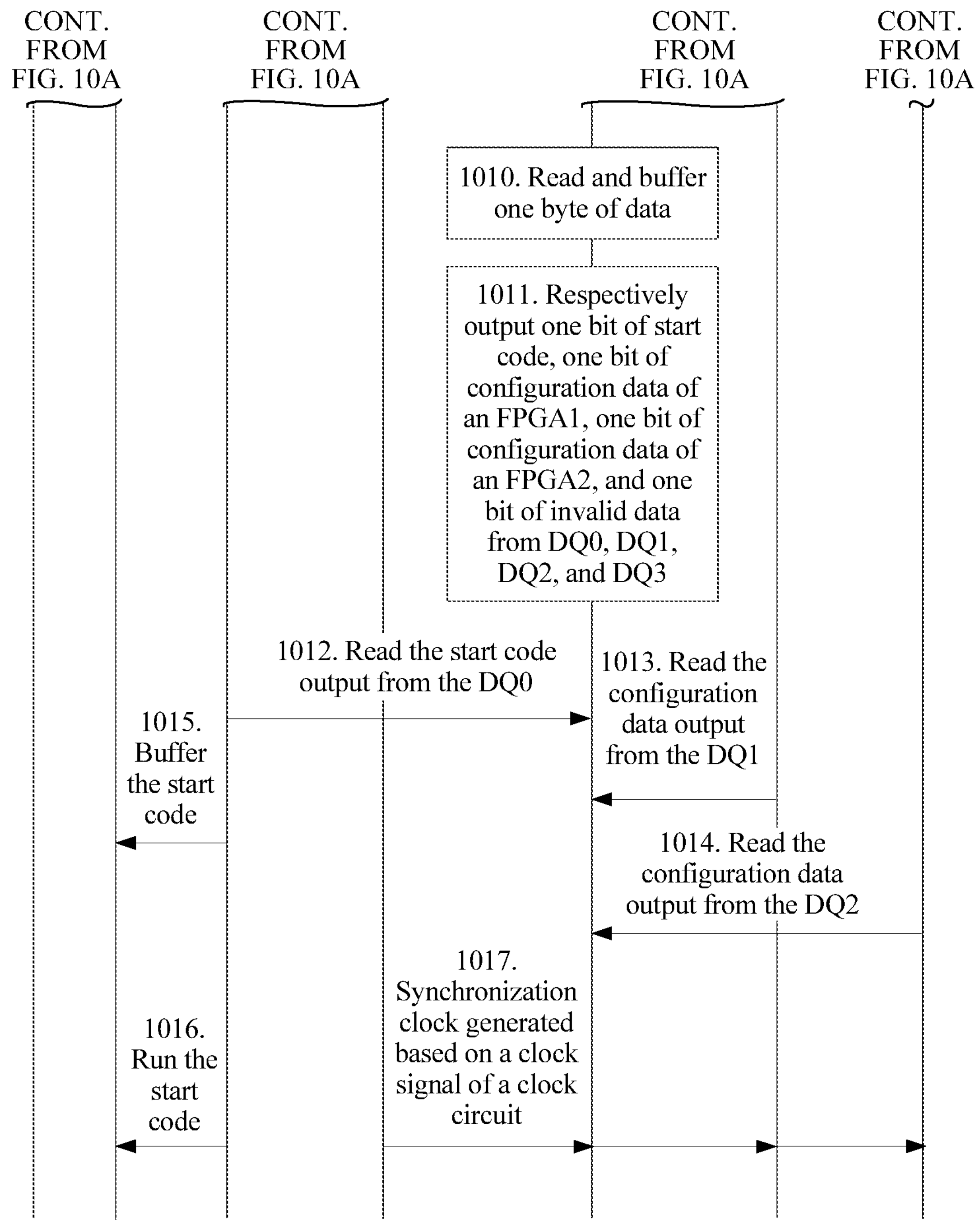

For ease of understanding, with reference to the data loading system in FIG. 9, a data loading process of the data loading system in this embodiment is described. FIG. 10A and FIG. 10B are a schematic flowchart of an embodiment of a data loading method based on the data loading system shown in FIG. 9. The method in this embodiment may include the following steps.

Step 1001. After a board is powered on and reset, a reset circuit sends a reset signal to a processor and a clock processing logic circuit.

Step 1002. The processor is powered on and reset in response to the reset signal, and executes initialization code in a ROM in the processor to complete initialization on the processor and a memory.

Step 1003. When determining, based on the reset signal, that the board currently performs cold start, the clock processing logic circuit sends a configuration clear instruction signal PROGRAM to an FPGA1 and an FPGA2.

Step 1002 and step 1003 may be simultaneously performed.

Step 1004. The FPGA1 clears configuration data in the FPGA1 in response to the signal PROGRAM, and after clearing the configuration data in the FPGA1, returns, to the clock processing logic circuit, a clear completion indication INIT signal that is used to indicate that the configuration data is cleared.

Step 1005. The FPGA2 clears configuration data in the FPGA2 in response to the signal PROGRAM, and after clearing the configuration data in the FPGA2, returns, to the clock processing logic circuit, a clear completion indication INIT signal that is used to indicate that the configuration data is cleared.

Step 1006. The clock processing logic circuit receives a synchronization signal input by the processor, generates three synchronization clocks based on a clock signal output by the processor, and separately outputs the three synchronization clocks to the FPGA1, the FPGA2, and a flash memory.

The synchronization clock input by the processor in step 1006 is the first synchronization clock described in the foregoing embodiment.

Step 1007. The processor sends a valid chip select signal to the flash memory using a chip select input pin in the flash memory.

If a low level is active for the chip select signal, the processor may send a low-level chip select signal.

A sequence of performing step 1006 and step 1007 is not limited in FIG. 10A and FIG. 10B. In actual application, the two steps are simultaneously performed.

Step 1008. The processor sends a quad output fast read command to the flash memory using DQ0.

Step 1009. The processor sends a start address of a read operation to the flash memory using the DQ0.

Step 1010. Under triggering of a synchronization clock, the flash memory reads, based on the start address and a read rule of reading one byte of data each time, one byte of data from an internal storage unit of the flash memory and buffers the one byte of data.

The one byte includes two data zones, and each data zone is sequentially one bit of invalid data, one bit of configuration data of the FPGA2, one bit of configuration data of the FPGA1, and one bit of start code.

Step 1011. When a falling edge of the synchronization clock arrives, the flash memory extracts, from the currently buffered one byte of data, four consecutive bits of data corresponding to a current to-be-output data zone, and respectively outputs one bit of start code, one bit of configuration data of the FPGA1, one bit of configuration data of the FPGA2, and one bit of invalid data in the four consecutive bits of data from the DQ0, DQ1, DQ2, and DQ3.

For example, the flash memory extracts, from the currently buffered one byte of data, data in current to-be-output bits, bit 7, bit 6, bit 5, and bit 4, and bit 7 to bit 4 are respectively used to store the one bit of invalid data, the one bit of configuration data of the FPGA2, the one bit of configuration data of the FPGA1, and the one bit of start code such that bits 7, 6, 5, and 4 can be respectively output from the DQ3, the DQ2, the DQ1, and the DQ0. The invalid data is output from the DQ3, the configuration data of the FPGA2 is output from the DQ2, the configuration data of the FPGA1 is output from the DQ1, and the start code of the processor is fixedly output from the DQ0.

Step 1012. When a rising edge of the synchronization clock arrives, the processor reads, from a data input/output pin connected to the DQ0, the one bit of start code output from the DQ0.

Step 1013. When the rising edge of the synchronization clock arrives, the FPGA1 reads, from a data input/output pin connected to the DQ1, the one bit of configuration data output from the DQ1.

Step 1014. When the rising edge of the synchronization clock arrives, the FPGA2 reads, from a data input/output pin connected to the DQ2, the one bit of configuration data output from the DQ2.

Step 1015. The processor buffers the read start code into the memory.

Step 1016. When all start code of the processor is currently obtained, the processor stops outputting the synchronization clock of the processor to the clock processing logic circuit, and runs the start code in the memory.

Further, a processing module packaged into the processor controls a SPI module to stop outputting an SPI synchronization clock.

Step 1017. When the clock processing logic circuit determines that the processor currently obtains all the start code, and neither the FPGA1 nor FPGA2 sends a loading completion indication, the clock processing logic circuit receives a synchronization clock input by an external SPI clock module, generates three synchronization clocks based on a clock signal of the external SPI clock module, and separately outputs the three synchronization clocks to the flash memory, the FPGA1, and the FPGA2, until the logic circuit detects that both the FPGA1 and the FPGA2 send the loading completion indication.

After the clock processing logic circuit is switched to receive the synchronization clock input by the external SPI clock module, the flash memory still continues to perform step 1011 until the FPGA1 and the FPGA2 complete loading of the configuration data.

After the FPGA component loads all the required configuration data, the processor may initialize a programmable logic device, to jump to perform a corresponding service in the memory.

It may be understood that in any one of the foregoing embodiments of this application, data stored in a nonvolatile memory can further support online upgrade. For example, when the nonvolatile memory is the flash memory, and the flash memory has an SPI, because only the data input/output pin DQ0 in the flash memory is connected to the processor, and another data input/output pin is connected to an FPGA, upgrade data in the flash memory can be provided only by the processor.

Based on a working mode of the flash memory, data stored in the flash memory may be upgraded online using a page program command sent by the processor, for example, a command word of the page program command is 0x02, and the command word of the page program command may also be input by the processor to the pin DQ0. It should be noted that before inputting the page program command, the processor further needs to first input a write enable command (a command word is 0x06). After the data in the flash memory is upgraded online, a write disable command (a command word is 0x04) further needs to be input. Then the processor may send a read operation command to the flash memory to trigger the flash memory to output data, and implement data loading on the processor and the FPGA.

The embodiments in the specification are all described in a progressive manner. For same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

The embodiments disclosed above are described to enable a person skilled in the art to implement or use this application. Various modifications made to the embodiments are obvious to a person skilled in the art, and the general principles defined herein may also be implemented in other embodiments without departing from the spirit or scope of this application. Therefore, this application is not limited to these embodiments described herein, but shall be construed in the widest scope consistent with the principles and novel features disclosed herein.

What is claimed is:

1. A data loading system, comprising:

a nonvolatile memory;

a processing circuit;

a serial peripheral interface (SPI) circuit coupled to the processing circuit and configured to output a first synchronization clock to a clock processing logic circuit under the control of the processing circuit; and a programmable logic device, wherein the processing circuit and the programmable logic device are separately coupled to different data interfaces of the nonvolatile memory, wherein the nonvolatile memory is configured to store start code of the processing circuit and configuration data of the programmable logic device, wherein the processing circuit and the programmable logic device are configured to respectively obtain the start code and the configuration data from the nonvolatile memory at the same time under an action of a first synchronization clock, wherein the first synchronization clock is an SPI synchronization clock, and wherein the clock processing logic circuit is configured to:

divide the received first synchronization clock into two channels of the first synchronization clock; and simultaneously output the two channels of the first synchronization clock to the programmable logic device and the nonvolatile memory.

2. The data loading system of claim 1, wherein the nonvolatile memory is configured to use an SPI, wherein an input/output pin in the SPI circuit is coupled to a first input/output pin (DQ0) in the SPI of the nonvolatile memory, wherein the programmable logic device is coupled to a second pin in the SPI of the nonvolatile memory, and wherein the second pin is an input/output pin other than the DQ0 in the SPI of the nonvolatile memory.

3. The data loading system of claim 2, wherein the processing circuit is further configured to control the SPI circuit to send a read command and a start address to the DQ0 in the SPI of the nonvolatile memory to enable the nonvolatile memory to output the start code from the DQ0 and to output the configuration data from the second pin according to the read command and the start address.

4. The data loading system of claim 3, wherein the nonvolatile memory is configured to work in an extended SPI protocol mode, and wherein the read command is a dual output fast read command.

5. The data loading system of claim 4, wherein the nonvolatile memory is coupled to one programmable logic device, and wherein in each byte stored in the nonvolatile memory, bits seven, five, three, and one store the configuration data, and bits six, four, two, and zero store the start code.

6. The data loading system of claim 3, wherein the nonvolatile memory is configured to work in an extended SPI protocol mode, and wherein the read command is a quad output fast read command.

7. The data loading system of claim 6, wherein the nonvolatile memory is coupled to one programmable logic device, wherein bits four and zero in each byte stored in the nonvolatile memory store the start code, and wherein a bit in each byte corresponding to the second pin stores the configuration data.

8. The data loading system of claim 2, wherein the SPI circuit and the processing circuit are packaged into a chip.

9. The data loading system of claim 2, wherein the SPI circuit is packaged into a southbridge chip.

10. The data loading system of claim 1, further comprising an external SPI clock circuit, wherein after obtaining all start code, the processing circuit is further configured to:

control the SPI circuit to stop outputting the first synchronization clock; and determine whether the programmable logic device loads all configuration data, and wherein the processing circuit determines that the programmable logic device does not load all the configuration data and the clock processing logic circuit is further configured to:

receive a second synchronization clock from the external SPI clock circuit;

divide the second synchronization clock into two channels of synchronization clock; and simultaneously output the two channels of the synchronization clock to the programmable logic device and the nonvolatile memory, wherein the second synchronization clock is another SPI synchronization clock.

11. The data loading system of claim 10, wherein the processing circuit is further configured to control the SPI circuit to send a read command and a start address to the DQ0 in the SPI of the nonvolatile memory to enable the nonvolatile memory to output the start code from the DQ0 and to output the configuration data from the second pin according to the read command and the start address.

12. The data loading system of claim 11, wherein the nonvolatile memory is configured to work in an extended SPI protocol mode, and wherein the read command is a dual output fast read command.

13. The data loading system of claim 12, wherein the nonvolatile memory is coupled to one programmable logic device, and wherein in each byte stored in the nonvolatile memory, bits seven, five, three, and one store the configuration data, and bits six, four, two, and zero store the start code.

14. The data loading system of claim 11, wherein the nonvolatile memory is configured to work in an extended SPI protocol mode, and wherein the read command is a quad output fast read command.

15. The data loading system of claim 14, wherein the nonvolatile memory is coupled to one programmable logic device, wherein bits four and zero in each byte stored in the nonvolatile memory store the start code, and wherein a bit in each byte corresponding to the second pin stores the configuration data.

16. The data loading system of claim 10, wherein when the programmable logic device obtains all the configuration data for the programmable logic device, the processing circuit is further configured to control the programmable logic device to perform initialization based on the configuration data.

17. The data loading system of claim 1, wherein the data loading system is applied to a server.

18. The data loading system of claim 1, wherein the two channels of the first synchronization clock comprise clock frequencies as same as that of the first synchronization clock.

19. The data loading system of claim 1, wherein the two channels of the synchronization clock comprise clock frequencies as same as that of the second synchronization clock.

20. The data loading system of claim 1, wherein before receiving the first synchronization clock, the clock processing logic circuit configured to send a configuration clear instruction to the programmable logic device, and wherein the configuration clear instruction instructs the programmable logic device to clear the configuration data in the programmable logic device.

* * * * *